(12) United States Patent
Un et al.

(10) Patent No.: US 7,653,087 B2
(45) Date of Patent: Jan. 26, 2010

(54) METHODS OF SYNCHRONIZING SUBSCRIBER STATIONS TO COMMUNICATIONS NETWORKS

(75) Inventors: Mehmet Un, Santa Clara, CA (US); Kartik Raju, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 716 days.

(21) Appl. No.: 11/327,097

(22) Filed: Jan. 6, 2006

(65) Prior Publication Data

US 2007/0160083 A1 Jul. 12, 2007

(51) Int. Cl.
H04J 3/16 (2006.01)

(52) U.S. Cl. ............... 370/469; 370/470; 370/503; 370/324

(58) Field of Classification Search ........... 370/252, 370/468, 324, 496, 470, 503
See application file for complete search history.

(56) References Cited

U.S. PATENT DOCUMENTS

| | | | | |
|---|---|---|---|---|
| 7,197,022 | B2* | 3/2007 | Stanwood et al. | 370/337 |
| 7,428,227 | B2* | 9/2008 | Park et al. | 370/331 |
| 7,525,991 | B2* | 4/2009 | Hirano et al. | 370/469 |
| 2005/0249183 | A1* | 11/2005 | Danon et al. | 370/347 |
| 2005/0259685 | A1* | 11/2005 | Chang et al. | 370/469 |
| 2006/0034174 | A1* | 2/2006 | Nishibayashi et al. | 370/235 |
| 2006/0126847 | A1* | 6/2006 | Ho | 380/277 |
| 2006/0160536 | A1* | 7/2006 | Chou | 455/435.1 |

OTHER PUBLICATIONS

"1-Gigabit Ethernet Media Access Controller (MAC) with Network Management," Product Brochure, Jul. 2001, 1 page, Sierra Research and Technology, Inc., Westlake Village, CA, USA.
"100/10-Mbit/s Ethernet Stand-alone MAC with Optional Network Services," Product Brochure, Jul. 2001, 1 page, Sierra Research and Technology, Inc., Westlake Village, CA, USA.
"PCI-Based 100/10-Mbit/s Ethernet Controller with Optional Network Services," Product Brochure, Jul. 2001, 1 page, Sierra Research and Technology, Inc., Westlake Village, CA, USA.
"Customizing a Soft Microprocessor Core," White Paper, Year 2002, 3 pages, month unknown, ARC International, www.arc.com, San Jose, CA, USA.

(Continued)

*Primary Examiner*—Ricky Ngo
*Assistant Examiner*—Dewanda Samuel
(74) *Attorney, Agent, or Firm*—Baker Botts L.L.P.

(57) ABSTRACT

A method for operating a media-access control unit in communications network includes placing the unit in a scan mode where the cyclic-prefix length and frame length of frames of data transmitted by a base station are ascertained and one or more parameters relating to the signal quality of the base station are collected. Data is not exchanged with a higher protocol-layer unit during this scan mode. The method also includes the unit remaining in the scan mode until at least a point in time when the unit is receiving frame control headers at an interval equal to the ascertained frame length. The unit is thereafter placed in a run mode in which the unit processes at least one flow of data to the higher protocol-layer unit once the cyclic-prefix length and the frame length are ascertained.

3 Claims, 11 Drawing Sheets

OTHER PUBLICATIONS

Ekland, et al., "IEEE Standard 802.16: A Technical Overview of the WirelessMAN™ Air Interface for Broadband Wireless Access," IEEE Communications Magazine, Jun. 2002, pp. 98-107, IEEE, New York, NY, USA.

"The ARCtangent™-A4 Processor," Year 2003, Product Brochure, month unknown, 4 pages, ARC International, www.arc.com, San Jose, CA, USA.

"WiMAX Technology and Deployment for Last-Mile Wireless Broadband and Backhaul Applications," White Paper, Aug. 2004, 10 pages, Fujitsu Microelectronics America, Inc., http://us.fujitsu.com/micro/WiMAX, San Jose, CA, USA.

George Wu, "WiMAX Deployment: Fujitsu Perspective," Conference Presentation at the MIT-CommTech Series: WiMAX, The Great Wireless Hope held in Palo Alto, CA, Sep. 21, 2004, 18 pages, Fujitsu Microelectronics America, Inc., http://us.fujitsu.com/micro/WiMAX, San Jose, CA, USA.

Reza Golshan, "WiMAX Overview," Conference Presentation at the MIT-CommTech Series: WiMAX, The Great Wireless Hope held in Palo Alto, CA, Sep. 21, 2004, 23 pages, Fujitsu Microelectronics America, Inc., http://us.fujitsu.com/micro/WiMAX, San Jose, CA, USA.

Reza Golshan, "Technical Update: Examining the Reality of WiMAX as a Global Standard," Conference Presentation at Emerging Broadband Wireless Technologies Summit held in San Jose, CA, Sep. 28, 2004, 13 pages, Fujitsu Microelectronics America, Inc., http://us.fujitsu.com/micro/WiMAX, San Jose, CA, USA.

"IEEE Standard 802.16™-2004 Part 16: Air Interface for Fixed Broadband Wireless Access Systems," IEEE Standard 802.16, Oct. 1, 2004, 893 pages, IEEE, New York, NY, USA.

George Wu, "WiMAX Technology and Deployment: Fujitsu Perspective," Conference Presentation at the ITAA Web Cast held in Washington, D.C., Oct. 19, 2004, 31 pages, Fujitsu Microelectronics America, Inc., http://us.fujitsu.com/micro/WiMAX, San Jose, CA, USA.

"RF Spectrum Utilization in WiMAX," White Paper, Nov. 2004, 9 pages, Fujitsu Microelectronics America, Inc., http://us.fujitsu.com/micro/WiMAX, San Jose, CA, USA.

Keith Horn, "Designing for Development," Conference Presentation at the Wireless Broadband Forum held in Cambridge, UK, Nov. 15, 2004, 15 pages, Fujitsu Microelectronics America, Inc., http://us.fujitsu.com/micro/WiMAX, San Jose, CA, USA.

George Wu, "WiMAX Deployment—Fujitsu Perspective," Conference Presentation on Wireless Expo, Virtual Tradeshow (www.wirelessexpo.net), Nov. 17, 2004, 18 pages, Fujitsu Microelectronics America, Inc., http://us.fujitsu.com/micro/WiMAX, San Jose, CA, USA.

"ARChitect™ Processor Configurator: The Power of Configurable Processing At Your Fingertips," White Paper, Year 2005, 9 pages, month unknown, ARC International, www.arc.com, San Jose, CA, USA.

Reza Golshan and Roger Bertschmann, "Semiconductor Integration Considerations for Broadband Wireless Access (BWA): Chip Marketing Sizing & Business Implications," Conference Presentation at WCA's International Symposium & Business Expo, Jan. 13, 2005, 13 pages, Fujitsu Microelectronics America, Inc., http://us.fujitsu.com/micro/WiMAX, San Jose, CA, USA.

George Wu, "Unleash WiMAX," Fujitsu WiMAX SoC Webcast, Mar. 3, 2005, 21 pages, Fujitsu Microelectronics America, Inc., http://us.fujitsu.com/micro/WiMAX, San Jose, CA, USA.

Keith Horn, "Keynote: WiMAX—Promise of Quantum Leap in Broadband Wireless Communications," Conference Presentation at Broadband Wireless World held in Las Vegas, NV, Apr. 21, 2005, 19 pages, Fujitsu Microelectronics America, Inc., http://us.fujitsu.com/micro/WiMAX, San Jose, CA, USA.

"MB87M3400, The Fujitsu WiMAX 802.16-2004 SoC," Fact Sheet, Apr. 21, 2005, 2 pages, Fujitsu Microelectronics America, Inc., http://us.fujitsu.com/micro/WiMAX, San Jose, CA, USA.

"MB87M3400, The Fujitsu WiMAX 802.16-2004 SoC," Product Brief, Apr. 21, 2005, 8 pages, Fujitsu Microelectronics America, Inc., http://us.fujitsu.com/micro/WiMAX, San Jose, CA, USA.

"Unleash WiMAX," Conference Presentation at Broadband Wireless World held in Las Vegas, NV, Apr. 21, 2005, 6 pages, Fujitsu Microelectronics America, Inc., San Jose, CA, USA.

"FujitsuFocus Spring/Summer 2005," Newsletter, after Apr. 21, 2005, 3 pages, Fujitsu Microelectronics America, Inc., http://us.fujitsu.com/micro/WiMAX, San Jose, CA, USA.

George Wu, "WiMAX, Logan and the Future of Broadband Wireless Networking," Conference Presentation at Terabeam Wireless Press Conference, Supercomm 2005, Jun. 7, 2005, 22 pages, Fujitsu Microelectronics America, Inc., http://us.fujitsu.com/micro/WiMAX, San Jose, CA, USA.

George Wu, "WiMAX—Promise of Quantum Leap in Broadband Wireless Communications," Conference Presentation at ITAA Conference held in Washington, D.C., Jun. 29, 2005, 27 pages, Fujitsu Microelectronics America, Inc., http://us.fujitsu.com/micro/WiMAX, San Jose, CA, USA.

"Design of a Multi-Sector Base Station Using the Fujitsu WiMAX SoC," Application Note, Oct. 2005, 6 pages, Fujitsu Microelectronics America, Inc., http://us.fujitsu.com/micro/WiMAX, San Jose, CA, USA.

Keith Horn, "The Semiconductor Technology Fuels WiMAX Success: Providing WiMAX System Solutions Utilizing the New IDM Business Model," Conference Presentation at Global WiMAX Summit held in Beijing, China, Nov. 10, 2005, 27 pages, Fujitsu Microelectronics America, Inc., http://us.fujitsu.com/micro/WiMAX, San Jose, CA, USA.

* cited by examiner

*(TDD Mode)*

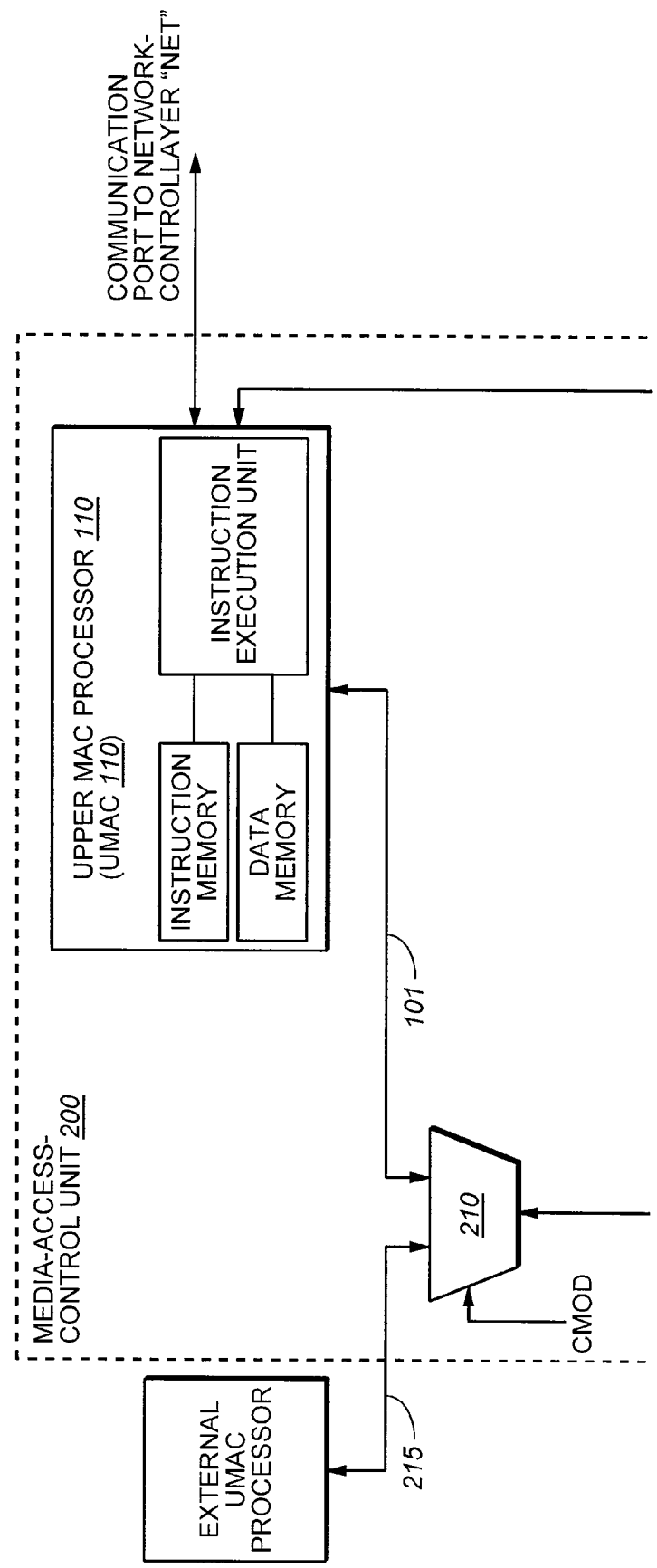

METHODS OF SYNCHRONIZING SUBSCRIBER STATIONS TO COMMUNICATIONS NETWORKS

FIELD OF THE INVENTION

The present invention relates to methods of synchronizing subscriber stations to communications networks, particularly networks operating according to the IEEE 802.16 Wireless Standard.

BACKGROUND OF THE INVENTION

In the network communications field, information is generally conveyed from one station to another in the form of packets. The sending station parses the information to be sent in a series of packets, each with an identification header, and sends them to the destination station, which reassembles original information from the packets. There are many tasks that are performed at each station to facilitate the handling of the packets. Generally established network communication standards divide the tasks into several protocol layers (generally around seven). The bottommost protocol layer is often called the "physical layer" or "PHY layer," and it is responsible for physically transmitting the packets and receiving the packets by way of a communications medium, which may be a fiber-optic connection, a wired connection, a wireless connection, or any combination of these connections as well as other types of connections. The PHY layer works with data organized in protocol data units (PDUs) called "forward-error correction blocks" or FEC blocks. The format of the data bits that appear on the communications media is generated from FEC blocks processed by the PHY layers on the network. The PHY layer is typically implemented in hardware while the protocol layers above it are often implemented in software running on a processor that sends and receives data and commands to the physical layer.

Typical layers immediately above the physical layer are called the link layer and media access layer, depending upon particular communication sub-fields. These layers perform many time critical tasks and often handle packet traffic from several different applications running on the station that they support. At the same time, packet communication networks are being asked to carry more data faster, and to provide more functionality. To complicate matters, the processes that the link layer and media access layer carry out are often governed by industry standards that are subject to change and revision. As part of making their invention, the inventors have recognized that the above trends are moving toward creating bottlenecks in the software and hardware, and there will be a need in the art to address these pending bottlenecks with the flexibility to adapt to changes in industry standards.

SUMMARY OF THE INVENTION

To address the above problems, the present application discloses several related groups of inventions. A first group of inventions of the present application encompasses a media-access control unit that processes the flow of data between a higher protocol-layer unit and a physical-layer control unit of a network communications component. The physical-layer control unit interfaces with a communications medium and has an input port to receive data in the form of forward-error correction blocks to be transmitted to the communications medium and an output port to provide data in the form of forward-error correction blocks that have been received from the communications medium. An exemplary media-access control unit according to the first group of inventions comprises a first processor (called "UMAC" for short in the specification) that receives high-level data units from the higher protocol-layer unit and generates outgoing media-access-control (MAC) protocol-data units therefrom. The first processor assigns connection identifiers to each outgoing MAC protocol-data unit. It has an instruction execution unit, an instruction memory, and a data memory. The exemplary media-access control unit further comprises a second processor (called "LMAC" for short in the specification) that receives outgoing MAC protocol-data units generated by the first processor and generates outgoing FEC blocks therefrom for outputting to the input port of the physical-layer control unit. The second processor has an instruction execution unit, an instruction memory, a data memory, an output port to provide outgoing FEC blocks to the physical-layer control unit, and an input port to receive incoming FEC blocks from the physical-layer control unit. In further embodiments, the physical-layer control unit has an interrupt signal to indicate the presence of incoming FEC blocks for the second processor, and the second processor further comprises an interrupt input port to receive the interrupt signal, to which it is responsive. The second processor generates incoming MAC protocol-data units from the incoming FEC blocks and passes them to the first processor.

Additional inventions of the present application are directed efficient handling of messages between network processors, such as the first and second processors described above, efficient handling of data, downlink maps, connection identifiers, and encryption keys in processors that implement media-access layers, efficient updating of DIUC codes, efficient filtering of MAC PDUs based on connection identifiers, efficient generation of CRC and HCS values, efficient payload encryption and decryption.

Yet more inventions of the present application are directed to enabling a low-level media access layer processors to be selectively coupled between two or more high-level media access processors by way of extension buses.

Still more inventions of the present application are directed to methods of efficiently synchronizing subscriber stations to communications networks.

Accordingly, it is an objective of one or more of the inventions disclosed herein to increase the efficiency of processors that implement media access control layers.

It is yet another objective of one or more of the inventions disclosed herein to increase the overall efficiency processing packet traffic in communications networks.

It is yet another objective of one or more of the inventions disclosed herein to increase provide a media-access control unit on a single integrated chip that has the flexibility to be used in both base stations and subscriber stations.

These and other objects of the present invention will become apparent to those skilled in the art from the following detailed description of the invention, the accompanying drawings, and the appended claims.

DETAILED DESCRIPTION OF THE INVENTION

In the following description, numerous specific details are set forth to provide a more thorough description of the specific embodiments of the inventions. It is apparent, however, that the inventions may be practiced without all the specific details given below. In other instances, well known features have not been described in detail so as not to obscure the inventions.

Figure 1:
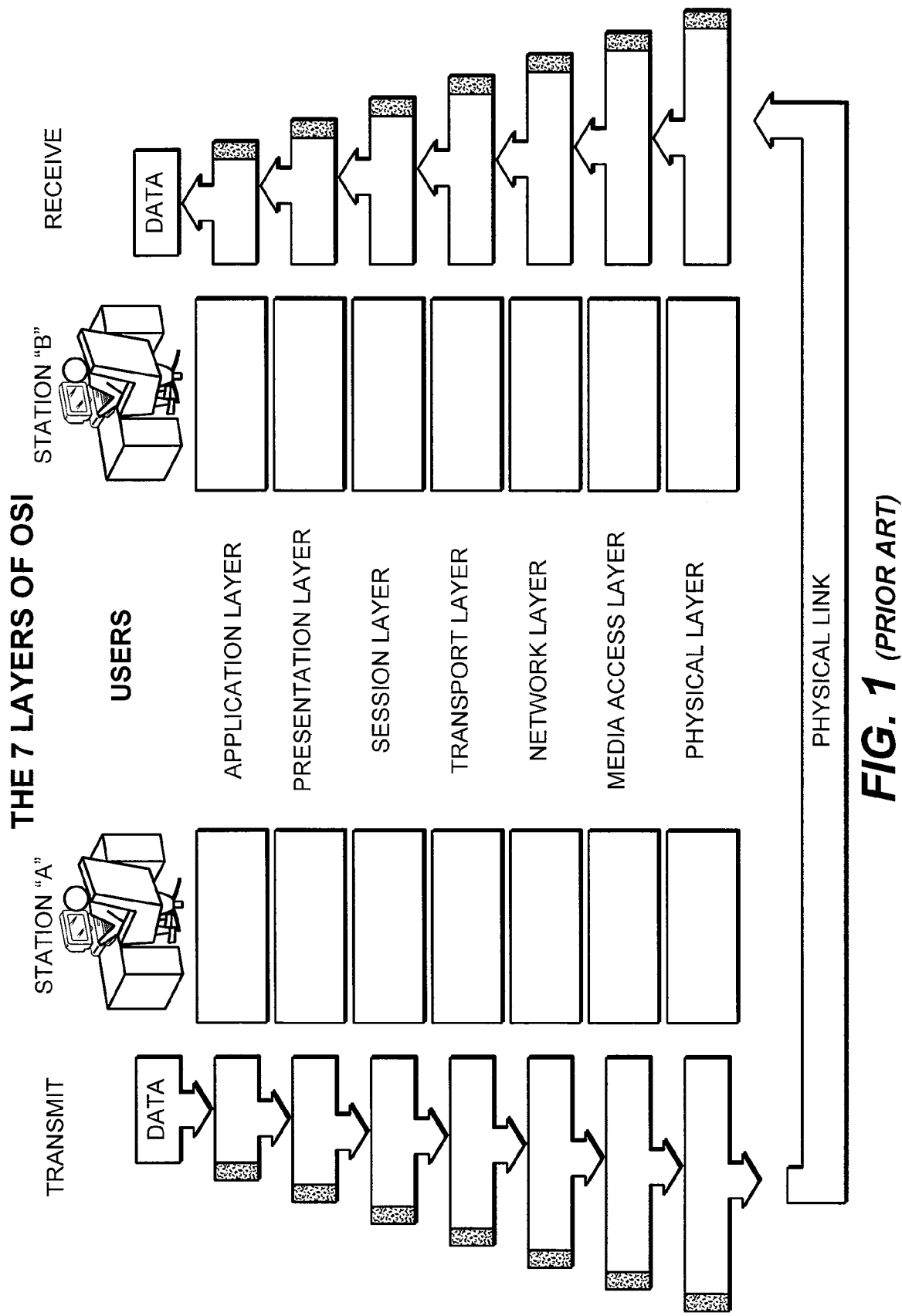
FIG. 1 is a diagram illustrating the Open Systems Interconnection Reference Model according to the prior art.

OSI Model. Many communication networks are organized along the Open Systems Interconnection Reference Model (OSI Model or OSI Reference Model), which was developed as part of the Open Systems Interconnect initiative. The OSI Network Model is a seven-layer framework for organizing communications and computer network protocols. FIG. 1 illustrates the OSI model as applied to a communication connection between two computer stations, with station "A" sending information to station "B." A "communication connection" is a unidirectional flow of information from one station to another; one or more communication connections from one station to another may be conveyed by a "communication channel" between the stations. The information in the communication connection is passed as a data unit from one protocol layer to the next, starting at the top with the application layer in station "A," proceeding down to the bottom at the physical layer, where the data unit is physically transmitted over a communications medium to another physical layer located at a network node that serves station "B." From there, the data unit is passed up the hierarchy to the application layer that serves station "B." (Data units sent from station "B" to station "A" go through the same layers, but in the reverse order and through a different communication connection.) Each protocol layer has specific tasks to perform, which as a whole help to provide reliable and error-free communications between the stations. As each layer receives a data unit from the layer above, it adds further information to the data unit as needed to carry out its tasks, and, when needed, also reformats the data unit. This action, which is illustrated at the left side of FIG. 1, is often called "wrapping," and results in the physical size of the data unit increasing as it progresses down the stack of layers, and decreasing as it progresses up the stack of layers. In some cases, two or more data units may be combined together in the wrapping process. The form of a data unit that is worked on at a specific level is called a "protocol data unit," or PDU, for the layer. More formally, a PDU is the form of the data unit that is exchanged between peer protocol layers located on separate network nodes (e.g., two MAC layers on two separate computer stations). As the data unit moves between layers, it undergoes conversion from one type of PDU to another type of PDU. The conversion of the data from one PDU type to another is typically done by the protocol layer that is receiving the data when the data is going down the protocol stack, and by the protocol layer that is transmitting the data when the data is going up the protocol stack. (As will be seen below, exemplary embodiments of the present invention depart from this convention in that portions of the conversions between the MAC and PHY layers are done in the MAC layer.) Most of the functionality in the OSI model exists in many communications systems, although two or three OSI layers may be incorporated into one layer.

The Media-Access Control and Physical Protocol Layers. The inventions of the present application mainly pertain to the three lowest protocol layers of the OSI reference model: the network layer, the media-access control layer (MAC layer), and the physical layer (PHY layer), with emphasis primarily on the MAC and PHY layers. A PDU for the network layer is called a network PDU, and a PDU for the MAC layer is called a MAC PDU. A PDU for the physical layer comprises one or more preambles and a plurality of modulation symbols that carry forward-error correction blocks (FEC blocks). The preambles and modulation symbols are intended to be captured and demodulated by the receiving PHY layers on the network. Thus, the data bits that appear on the communication medium are generated from FEC blocks by the PHY layers on the network. These data bits can be conveyed over the physical communications medium in a number of forms, such as discrete voltage levels or as complex signal modulations, called modulation symbols, with common examples being BPSK, QPSK, QAM16, and QAM64. One such modulation symbol typically conveys several data bits. The network layer transmits the data between the parties (e.g., computer stations) in packets. It provides packet routing and forwarding by creating logical paths between nodes (choosing the best path for a packet). It also handles addressing and works to control packet congestion on the network. A widely used network layer protocol is the Internet Protocol (IP) layer. The MAC layer receives network PDUs from the network layer and converts them to outgoing MAC PDUs, and organizes the outgoing MAC PDUs (which carry the data packets) into frames, as described below. It also assigns connection identifiers (CIDs) to each outgoing MAC PDU to associate it to one of the MAC-level connections that are active on the network, and provides one or more error-free communication connections between two parties (each party usually being based at a respective network node) with basic flow control and frame synchronization, and with error detection (e.g. CRC). The MAC layer also manages connections established between parties, determines which incoming MAC PDUs are intended for its node by looking at the CIDs, filters out packet traffic that is not intended for its node (by looking at the CID), and conveys the incoming MAC PDUs intended for its node to the network layer.

Management of Data Transmission on the Network. In a typical point-to-multipoint (PMP) network, such as a local-area network or a wide-area network, there is a single base station (BS) that manages the flow of data packets to and from a plurality of subscriber stations (SS). Communications between any two subscriber stations are typically routed through the base station, and communications from subscriber stations to points outside of the network are typically routed through a gateway coupled to the base station, where the gateway is coupled to a larger network, such as an Internet backbone. Any number of communication channels may be established amongst the stations, as determined by the needs of the users served by the stations, with each communication channel conveying one or more MAC-level connections. For example, several application programs being run by a user at a subscriber station may establish a number of communication channels between themselves and a base station, with the communication channels conveying several MAC-level connections. Examples of such application programs are internet browsers and word editing programs used to edit documents kept at a central file server at the base station. In many network communication standards, such as the IEEE 802.16 Wireless Standard, a "downlink" channel is established to convey data from the base station to a subscriber station, and an "uplink" channel is established to convey data from the subscriber station to the base station. The flow of data in each channel is unidirectional. In general, each such channel is dedicated to a particular application program running on the subscriber station or the base station, or to a particular set of application programs running on both stations; and each such channel can convey the MAC PDUs of one or more MAC-level connections. To manage the packet traffic between the base station and each of the subscriber stations, the base station establishes a repeating frame of physical time slots, or "physical slots" (PS) for short, with each physical slot having room for an integer number of modulation symbols. Each modulation symbol conveys an FEC block, which in turn conveys one or more MAC PDUs, or portions thereof. The time duration of a frame typically ranges between 2 milliseconds and 20 milliseconds.

Figure 2:
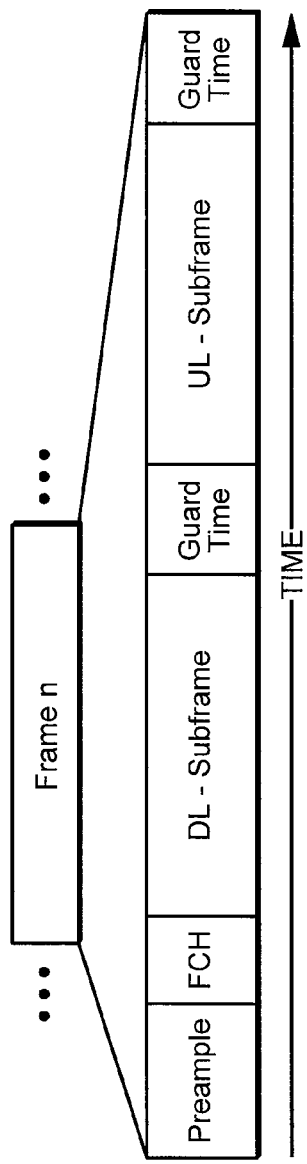
FIG. 2 is a general schematic diagram of a network communications frame according to the prior art.

Frame Structure. In many network communication standards, such as the IEEE 802.16 Wireless Standard, a portion of the frame known as the "downlink sub-frame" ("DL sub-frame") conveys the data bits of the downlink MAC-level connections, and another portion of the frame known as the "uplink sub-frame" ("UL sub-frame") conveys the data bits of the uplink MAC-level connections. This is illustrated in FIG. 2 for a case where the sub-frames are transmitted on the same frequency (or frequencies in the case of some modulation schemes), and are time-division multiplexed. This arrangement of sub-frames is called Time Division Duplexing (TDD). In other implementations, which are called Frequency Division Duplexing arrangements, the uplink sub-frames and the downlink sub-frames are transmitted on separate frequencies (or separate sets of frequencies in the case of some modulation schemes), with the downlink sub-frames following one another in time, and with the uplink sub-frames following one another in time. Each frame also has a frame control header (FCH) that is located at the start of each frame after a preamble message generated by the PHY layer, and that indicates the starting locations of the sub-frames. The positions of the MAC PDUs for a particular connection can vary from frame to frame, but can always be identified by the connection identifier (CID). In addition, there are guard times after each sub-frame to avoid conflicts in transmissions, and to give the base station and subscriber stations time to ramp up or ramp down their transmission carrier signals, as the case may be.

Figure 3:
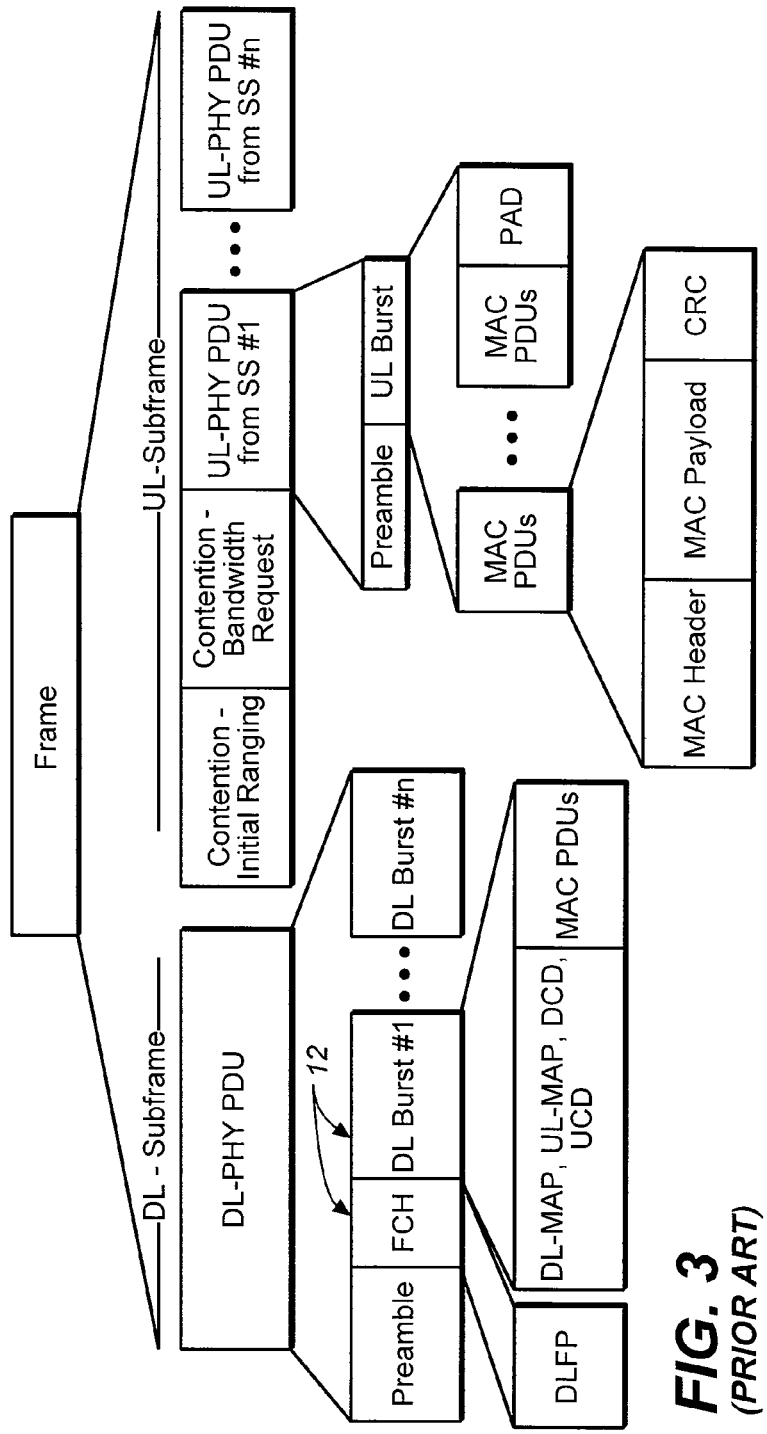
FIG. 3 is a detailed schematic diagram of a network communications frame according to the prior art.

The IEEE 802.16 Wireless Standard allows the modulation symbols of a frame to be transmitted by several different modulation methods. Each modulation method has an intrinsic degree of robustness (e.g., immunity to noise sources and reception distance) and an intrinsic data-carrying capacity (e.g., number of bits communicated per second), each of which are generally inversely related. For example, the BPSK modulation method has high robustness but low data-carrying capacity, while the QAM64 modulation method has low robustness but high data-carrying capacity. In general, a more robust modulation method is needed as the distance between the base station and the subscriber station increases, and as the weather becomes more inclement. The MAC layer of a base station can dynamically maximize the bandwidth for a particular communication connection by having the connection's MAC PDUs transmitted with the modulation method having the highest data-carrying capacity and the lowest robustness that still maintains data integrity for the given environmental conditions. By doing this for all of the connections it handles, the MAC layer of a base station can maximize the bandwidth of the frames. In this regard, it is advantageous for a MAC layer of a base station to use different modulation methods during a frame and to group the MAC PDUs such that all the MAC PDUs to be sent for a frame with a particular modulation method are transmitted in the same transmission burst (i.e., during a common time duration). However, the subscriber stations will need notice of the upcoming bursts of a frame and the modulation methods that will be used for each upcoming burst. To accomplish this, the frame control header is transmitted in the most robust modulation method (BPSK) and it contains a downlink frame prefix (DLFP) that provides an indication of the modulation formats for the first four bursts following the FCH, and an indication of the starting time or burst length of each of the bursts. If a downlink sub-frame has more than four bursts after the FCH, then the first burst after the FCH comprises a downlink map ("DL map") that contains this information for the remaining bursts in the downlink sub-frame. The first burst after the FCH is also transmitted in one of the more robust modulation methods, and comprises an uplink map ("UL map"). The downlink map contains data indicating the number of subsequent transmission bursts, an indication of the physical slot (PS) at which each additional transmission burst begins, and the modulation method used to generate the transmission burst. The relative positions of the FCH (DLFP) and the first downlink burst (DL Burst #1) in the downlink sub-frame are illustrated at 12 in FIG. 3. Each subscriber station reads the DLFP and the DL map to determine when and how to demodulate subsequent bursts, and reads the UL map to determine when it can send its data to the base station.

In the above way, a near-infinite sequence of frames is provided to convey the data bits of the MAC-level connections between the base station and the subscriber stations. In general, the MAC layer of the base station organizes the sequence of frames, including generating the content of the frame control headers (FCHs), DLFPs, DL maps and UL maps, and the PHY layer of the base station implements the FCHs, DL maps, UL maps, and MAC PDUs in FEC blocks for transmission onto the communications medium.

Figure 4:
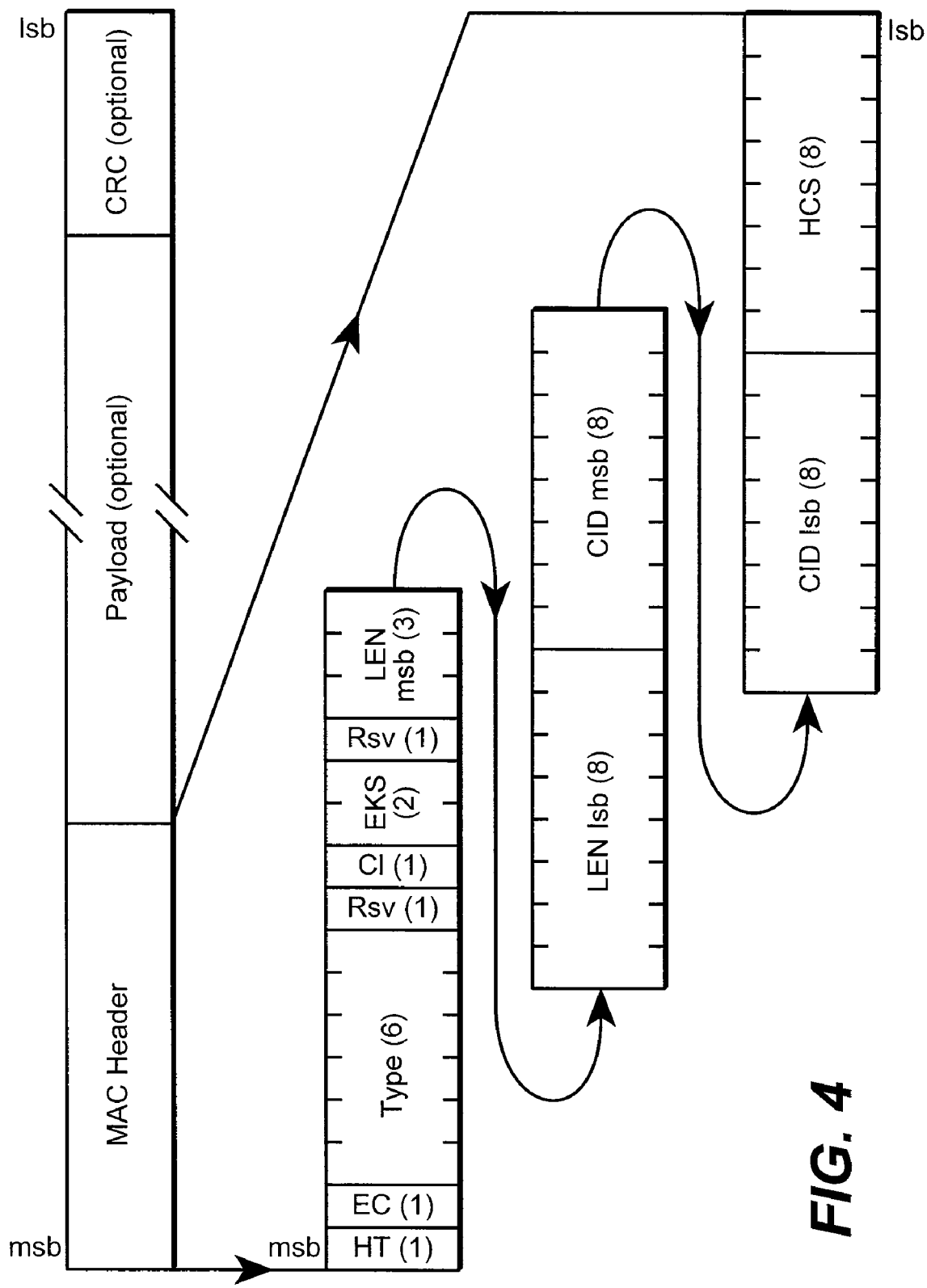
FIG. 4 is a detailed schematic diagram of a media-access-control (MAC) protocol-data unit (PDU) according to the prior art.

MAC PDU Structure. As illustrated in FIG. 4, a MAC PDU comprises a MAC header, an optional payload, and a cyclic-redundancy-check value at the end. The MAC header may have two types, a generic MAC header to indicate that the PDU is carrying a MAC management message or regular data traffic, or a bandwidth request header used by a subscriber station to request more bandwidth. The MAC header is six bytes long, and comprises the following fields for generic MAC headers:

(1) a 1-bit message-type field (HT) to indicate the type of MAC header,
 (2) a 1-bit encryption-control field (EC) to indicate whether the MAC PDU is encrypted,
 (3) a 6-bit type field (Type) to indicate the type of MAC message,
 (4) two reserved bits (Rsv) reserved for future possible use, (5) a 1-bit CRC-indicator field (CI) to indicate whether the PDU has a cyclic-redundancy check value, (6) a 2-bit encryption-key-sequence field (EKS) to provide an index to the traffic encryption key (TEK) and an initialization vector used to encrypt the payload if encryption has been done (as indicated by the EC field), (7) an 11-bit length field (LEN) to indicate the length of the MAC PDU, including payload and CRC (if present), in bytes, (8) a 16-bit connection-identifier field (CID) for other MAC layers to use in identifying the connection to which the MAC PDU belongs, (9) an 8-bit header-check sequence field (HCS) used to detect errors in the header.

The downlink connections between a base station and subscriber station may be conveyed in one or more downlink channels established between the two stations, where a channel may comprise a single frequency, a frequency band, or a set of distinct frequencies. The uplink connections may be similarly conveyed in one or more uplink channels. A downlink channel and uplink channel may share the same frequency, frequency band, or set of distinct frequencies, with the downlink data and uplink data being time-division multiplexed (TDD mode), or they may be separated in the frequency domain (FDD mode). The inventions of the present application may be explained and understood using the case where a single channel between the base station and the subscriber stations is used to convey the data in a time-division multiplexed manner (TDD mode), and the inventions of the present application may be readily extended without undue experimentation to implementations where multiple channels are used. In addition, various data structures used in the IEEE 802.16 Wireless Standard to construct the frames and to communicate messages between stations include data fields to select and distinguish among the channels, and one of ordinary skill in the art may consult the 802.16 standard for those implementation details. The inventions of the present application do not pertain to selection of multiple channels per se, and thus the description of multiple channels is minimized in the present application so as to not obscure the inventions. In addition, various data structures in the IEEE standard include MAC addresses for the base station and subscriber stations of a particular network so as to distinguish between multiple networks or to facilitate the establishment of some types of mesh networks. The inventions of the present application do not pertain to these features per se, and thus the description of multiple networks and support for them is minimized in the present application so as to not obscure the inventions. One of ordinary skill in the art may consult the IEEE 802.16 Wireless Standard for those implementation details, which is available from the IEEE and other providers of standards ("802.16 IEEE Standard for Local and Metropolitan Area Networks, Part 16: Air Interface for Fixed Broadband Wireless Access Systems"), the contents of which are incorporated herewith by reference.

Figure 5:
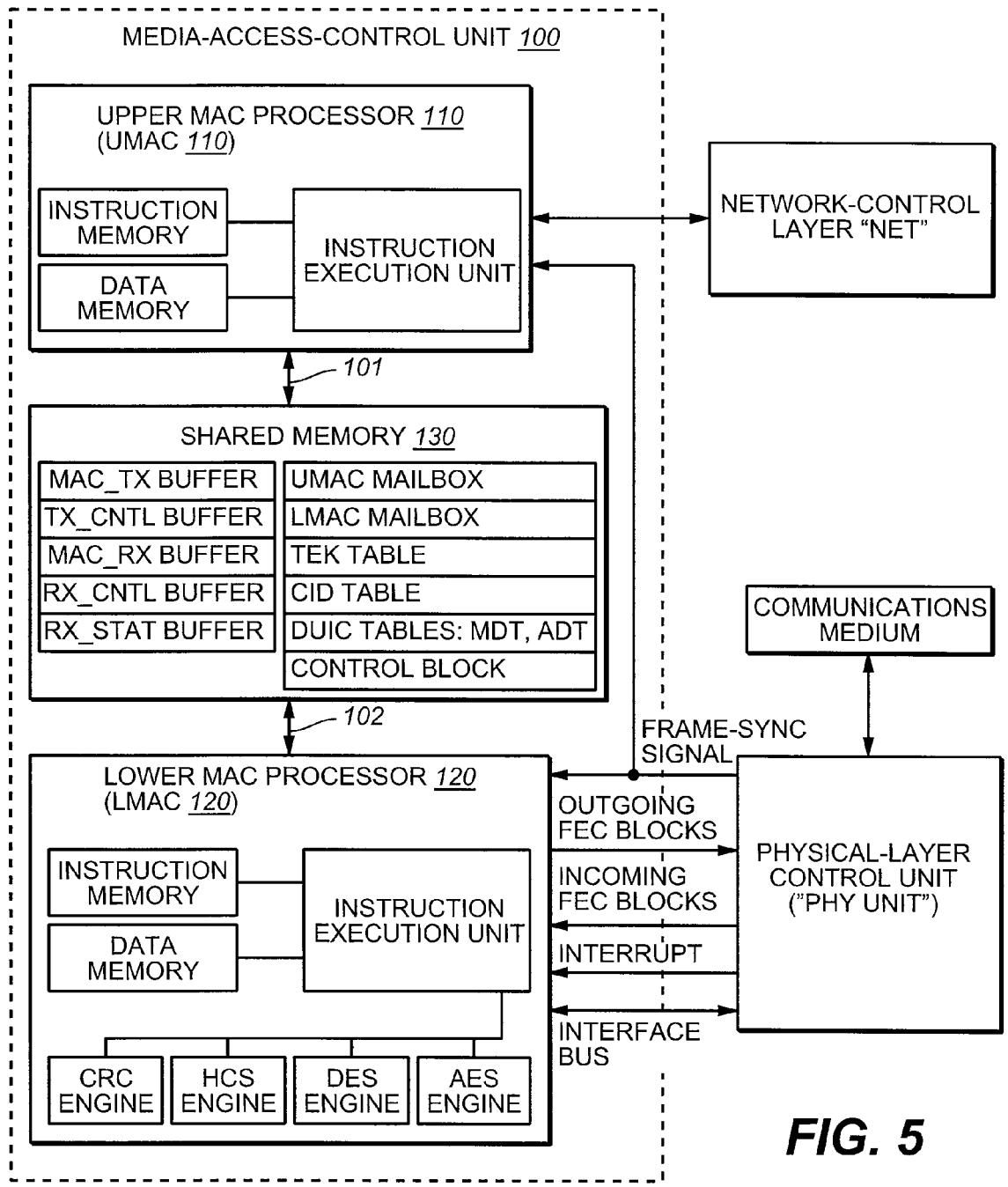
FIG. 5 shows an exemplary embodiment of a media-access control unit according to an invention of the present application.

General Overview. FIG. 5 shows an exemplary embodiment of a media-access control unit 100, herein referred to as MAC unit 100, according to the present invention. One instance of control unit 100 may be used to implement the MAC layer of a base station, and one or more additional instances of control unit 100 may be used to implement the MAC layers of one or more corresponding subscriber stations. MAC unit 100 processes the flow of data between a network-control layer "NET" and a physical-layer control unit of a network communications component. Network-control layer NET implements a network protocol-layer unit for the communications component (e.g., base station or subscriber station), which is a higher protocol layer than the physical layer, or the MAC layer. The physical-layer control unit, herein referred to as the "PHY Unit," interfaces with a communications medium and has an input port to receive data in the form of FEC blocks to be transmitted to the communications medium and an output port to provide data in the form of FEC blocks that have been received from the communications medium. MAC unit 100 comprises a first processor 110, called the Upper-MAC processor 110 or the UMAC 110, that receives high-level data units from the network-control layer NET and generates outgoing MAC protocol-data units therefrom. In addition, UMAC 110 assigns connection identifiers (CIDs) to each outgoing MAC protocol-data unit and schedules the transmission of the MAC PDUs in the frames. UMAC 110 has an instruction execution unit, an instruction memory, a data memory, sets of instructions that direct its operation (stored in the instruction memory), and a bus port for coupling to the network-control layer NET. Any type of bus may be used to couple UMAC 110 with the network-control layer NET, and the selection thereof is not part of the present inventions and is not critical to the implementation thereof.

MAC unit 100 further comprises a second processor 120, called the LMAC processor 120 or LMAC 120, that receives outgoing MAC protocol-data units generated by UMAC 110, and generates outgoing FEC blocks from the outgoing MAC PDUs for outputting to the input port of the PHY Unit. LMAC 120 has an instruction execution unit, an instruction memory, a data memory, an output port to provide outgoing FEC blocks to the physical-layer control unit, an input port to receive incoming FEC blocks from the physical-layer control unit, and sets of instructions that direct its operation (stored in the instruction memory). LMAC 120 also generates incoming MAC PDUs from the incoming FEC blocks received at its input port. For this, the PHY unit provides an interrupt signal to indicate the presence of incoming FEC blocks for LMAC 120, and LMAC 120 comprises an input port to receive the interrupt signal. LMAC 120 then passes a relevant one of the incoming MAC PDUs to UMAC 110, the relevant ones being those MAC PDUs that are intended for the MAC-layer connections being handled by MAC unit 100, as may be ascertained from the CID in the MAC PDU. LMAC 120 is readily implemented as an event-driven scheduler. In preferred embodiments, LMAC 120 further comprises several task-specific engines, with each engine comprising a state machine, data paths, and registers appropriate to its tasks. Specifically, LMAC 120 preferably has a CRC engine that computes the cyclic-redundancy-check values of the MAC PDUs, an HCS engine that computes the header-check sequences of the MAC-PDU headers, a DES engine to encrypt or decrypt the payloads of MAC-PDUs according to the Data Encryption Standard for those MAC-PDUs requiring encryption or decryption, and an AES engine to encrypt or decrypt the payloads of MAC-PDUs according to the Advanced Encryption Standard for those MAC-PDUs requiring encryption or decryption. The DES and AES engines also preferably implement the block cipher modes of these encryption standards (e.g., DES-CCM and AES-CCM).

Figure 7:
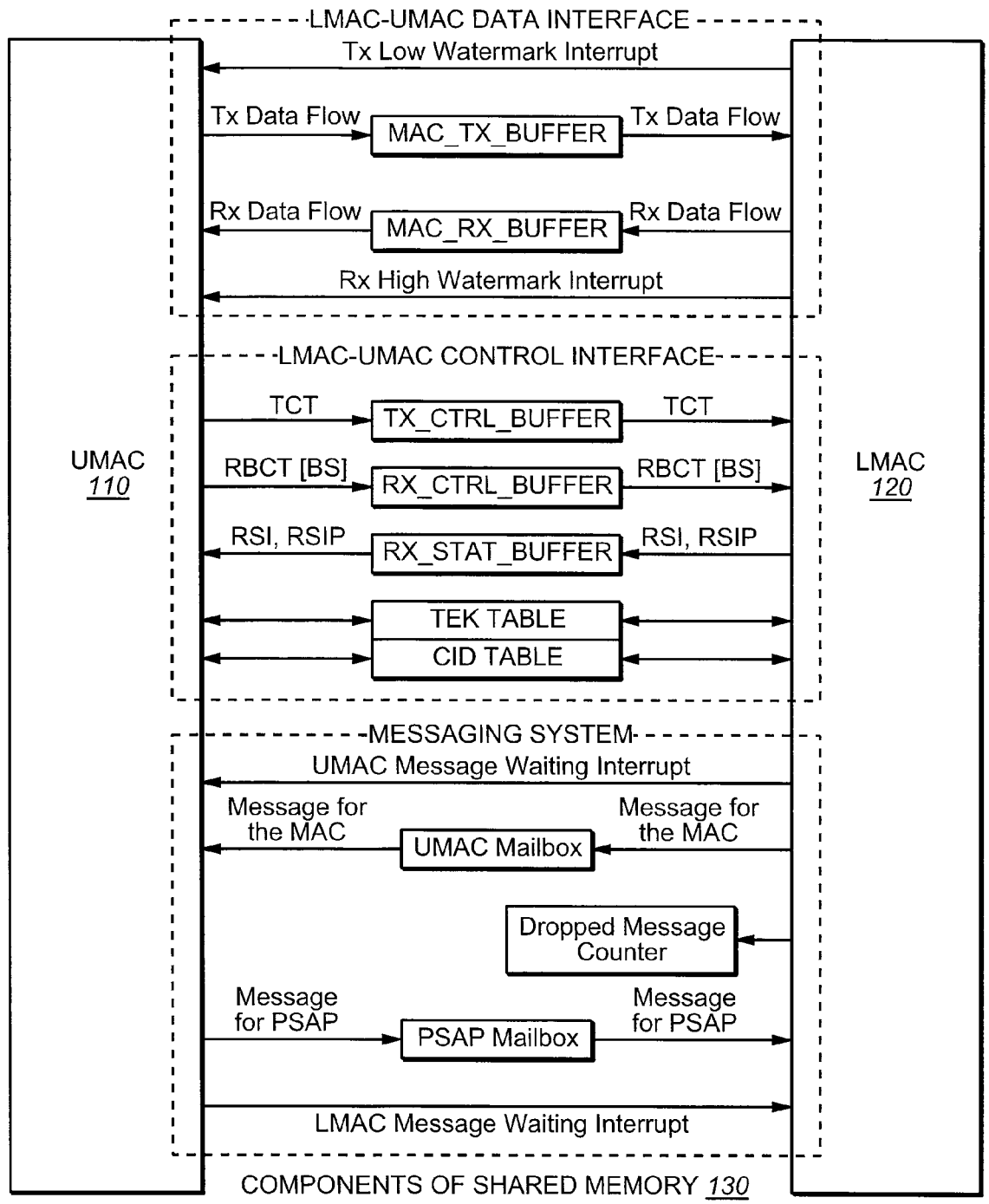
FIG. 7 is a schematic diagram showing the LMAC-UMAC data interface, LMAC-UMAC control interface, and the LMAC-UMAC Messaging System of the exemplary embodiment shown in FIG. 5 according to an invention of the present application.

UMAC 110 and LMAC 120 communicate with one another and exchange MAC PDUs with one another by way of a plurality of buffers, mailboxes, and tables contained in a shared memory 130. The components of memory 130 can be implemented as separate memory devices, or as partitions in one or more memory devices. In either case, each of the components is preferably accessible to UMAC 110 by a first bus 101, and to LMAC 120 by a second bus 102, with shared memory 130 having a dual-port architecture, and with each of UMAC 110, LMAC 120, and shared memory 130 having corresponding bus ports. Shared memory 130 may be incorporated as part of media-access control unit 100, or may be separated therefrom and coupled to UMAC 110 and LMAC 120. In each case, the partitioning and accessing of the memory is collectively done by processors 110 and 120. Sets of instructions on each of UMAC 110 and LMAC 120 direct their respective processors to convey information and data to and from several of the components of shared memory 130. These sets of instructions include three groups of instructions that convey data to and from the components of shared memory 130, with portions of each group running on UMAC 110 and LMAC 120. Referring to FIG. 7, the first group of instructions is part of the LMAC-UMAC Data Interface, and it directs the processors to convey MAC PDUs to and from components MAC_TX BUFFER and MAC_RX BUFFER of shared memory 130. The second group of instructions is part of the LMAC-UMAC Control Interface, and it directs the processors to exchange information on how the MAC PDUs are processed during the transmission and reception steps by way of buffers TX_CTRL BUFFER, RX_CTRL BUFFER, and RX_STAT BUFFER. The third group of instructions is part of the LMAC-UMAC Messaging System, and it directs the processors to communicate directives and configuration information by way of the UMAC and LMAC mailboxes.

UMAC 110 and LMAC 120 are preferably integrated together on a common integrated circuit chip (e.g., system on a chip), with the further integration of shared memory 130 as an option. In a further embodiment described below, connections may be provided for an externally implemented UMAC processor, and LMAC 120 may be configured to multiplex between an on-chip version of UMAC 110 and the connections to an external version of UMAC 110. LMAC 120 has three operating modes that are relevant to the discussions of the present invention: Idle Mode, Run Mode, and Scan Mode. In the idle mode, LMAC 120 does initialization tasks and waits for instructions from UMAC 110. Scan Mode is used in the case where MAC unit 100 is serving as a subscriber station. In Scan Mode, LMAC 120 synchronizes itself and the physical-layer control unit to the broadcast signals and frames of the base station. In Run Mode, LMAC 120 transfers data between UMAC 110 and the physical control unit. A more detailed discussion of these modes is provided after the components of shared memory 130 are described, and after various features of LMAC 120 and UMAC 110 are described.

An overview of the functions of each of the components of shared memory 130 and the related actions performed by the sets of instructions of UMAC 110 and LMAC 120 are discussed next, with a more detailed description of the components provided below. In view of the description of the present inventions herein, one of ordinary skill in the art will be able to readily implement the sets of instructions to provide the described actions in any desired computer language without undue experimentation. In addition, one of ordinary skill in the art will be able to readily implement additional sets of instructions to perform the functions described in the IEEE 802.16 Wireless Standard beyond that needed for the present inventions or that which is described herein. In addition, novices to this field can find tutorial information about the IEEE Wireless Standard on the Internet to help them in implementing the present invention without undue experimentation.

Figure 6:
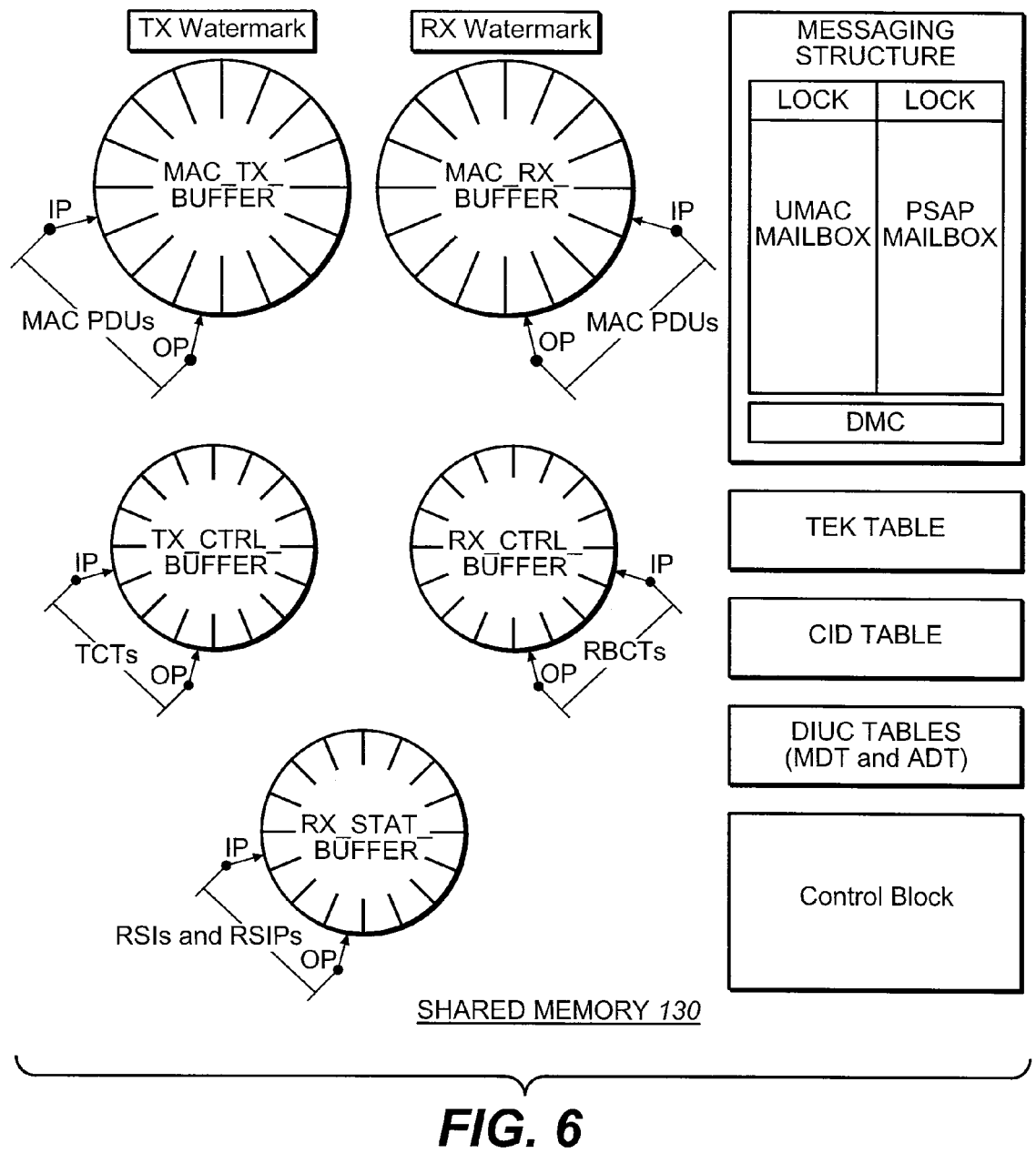
FIG. 6 shows a more detailed view of the shared memory of the exemplary embodiment shown in FIG. 5 according to an invention of the present application.

We refer to FIGS. 5-7 for the next several paragraphs of description. During Run Mode, and for both base-station and subscriber-station operations, outgoing MAC PDUs are stored in the MAC_TX BUFFER by UMAC 110, and retrieved therefrom by LMAC 120. Information on how the MAC PDUs are to be transmitted in outgoing bursts is stored in TX_CTRL BUFFER by UMAC 110, and retrieved therefrom by LMAC 120. For base-station operations, information on how the incoming bursts of incoming MAC PDUs are to be received and demodulated is stored in RX_CTRL BUFFER by UMAC 110, and retrieved therefrom by LMAC 120. (For subscriber-station operations, UMAC 110 is not involved in these tasks since LMAC 120 handles the reception of bursts automatically based on information received in the DLFP and the DL_MAP.) For both base-station and subscriber-station operations, incoming MAC PDUs are stored in the MAC_RX BUFFER by LMAC 120, and retrieved therefrom by UMAC 110. Information on how each incoming burst was received and demodulated is stored in RX_STAT BUFFER by LMAC 120, and optionally retrieved therefrom by UMAC 110 (however, for strict compliance with the IEEE Wireless Standard in most cases, UMAC 110 would have to receive and process this information). The traffic encryption keys for the MAC PDUs of encrypted connections are stored in the TEK TABLE by UMAC 110, and read therefrom by LMAC 120 as needed. The connection identifiers (CIDs) for all the connections being handled by media access control unit 100 for its station are stored in the CID memory by UMAC 110, and read therefrom by LMAC 120. Each downlink burst and each uplink burst can be transmitted according to a number of "burst profiles," with each burst profile comprising a modulation method and a set of configuration parameters for generating the FEC blocks. With each DL-map and downlink frame prefix (DLFP) received from the base station, a subscriber station receives a Downlink Interval Usage Code (DIUC) for each burst in the rest of the downlink sub-frame. The DIUCs are used to configure the PHY unit of the subscriber station to demodulate the downlink bursts and to decode the associated FEC blocks. During Idle, Scan, and Run modes of operation, non-traffic communications (all communications except for passing MAC PDUs) are provided by way of the UMAC MAILBOX and the LMAC MAILBOX. Finally, various pointers, interrupt signals, and flags are stored in the CONTROL BLOCK. A more detailed view of shared memory 130 is provided in FIG. 6, which will be referred to in the following detailed description of the components. After that, a more detailed description of some features of UMAC 110 and LMAC 120 will be given.

The MAC TX BUFFER is a transmission buffer that stores outgoing MAC PDUs. UMAC 110 fills (writes) this buffer with MAC PDUs at its pace, and LMAC 120 empties (reads) MAC PDUs from the buffer at its pace. The MAC_TX BUFFER preferably comprises a circular buffer having a fixed number of words, an input pointer IP that indicates the next memory location (i.e., address of next memory word) for the UMAC to store an outgoing MAC PDU, and an output pointer OP that indicates the next memory location for the LMAC to read an outgoing MAC PDU. The pointers IP and OP for this buffer can be located in the control block. Upon startup, the pointers IP and OP are set to the same memory location. UMAC 110 places an outgoing MAC PDU at the location indicated by pointer IP, and increments the value of the pointer by the number of words needed to store the MAC PDU (i.e., the length of the PDU rounded up to the next word boundary). LMAC 120 reads an outgoing MAC PDU starting at the location indicated by pointer OP only if the value of OP is different from the value of IP. The length of the MAC PDU is ascertained by LMAC 120 from the length field of the MAC's header (see FIG. 4), and from this LMAC 120 determines how many word locations to read, reads them, and updates the value of output pointer OP to the next word boundary that will occur after the MAC PDU is read. In preferred embodiments, LMAC 120 generates a low-TXwatermark signal indicating that the data size of the MAC PDUs in the MAC_TX BUFFER is below a designated amount, which can be varied during operation by UMAC 110 through the mailboxes described below in greater detail. UMAC 110 preferably treats the low-TX-watermark signal as an interrupt signal, and preferably responds to it by storing additional outgoing MAC protocol-data units in the MAC_TX BUFFER, if available. The low-TX-watermark signal can take the form of a bit flag that is stored in the control block, with UMAC 110 periodically monitoring the flag's value. FIG. 7 is a schematic illustration of the flow of outgoing MAC PDUs through the MAC_TX BUFFER, as well as the flow of incoming MAC PDUs through the MAC_RX BUFFER, which is discussed next.

The MAC RX BUFFER is a reception buffer that stores incoming MAC PDUs. LMAC 120 fills (writes) this buffer with MAC PDUs at its pace, and UMAC 110 empties (reads) MAC PDUs from the buffer at its pace. The MAC_RX BUFFER preferably comprises a circular buffer having a fixed number of words, an input pointer IP that indicates the next memory location (i.e., address of the next memory word) for LMAC 120 to store an incoming MAC PDU, and an output pointer OP that indicates the next memory location for UMAC 110 to read an incoming MAC PDU. The pointers IP and OP for this buffer can be located in the control block. Upon startup, the pointers IP and OP are set to the same memory location. LMAC 120 places an incoming MAC PDU at the location indicated by pointer IP, and increments the value of the pointer by the number of words needed to store the MAC PDU (i.e., the length of the PDU rounded up to the next word boundary). UMAC 110 reads incoming MAC PDUs starting at the location indicated by pointer OP only if the value of OP is different from the value of IP. The length of the MAC PDU is ascertained by UMAC 110 from the length field of the MAC's header, and from this UMAC 110 determines how many word locations to read, reads them, and updates the value of output pointer OP to the next word boundary that occurs after the last MAC PDU is read. In preferred embodiments, LMAC 120 generates a high-RX-watermark signal indicating that the data size of the MAC PDUs in the MAC_RX BUFFER is above a designated amount, which can be varied during operation by UMAC 110 through a command message passed to LMAC 120 via the LMAC mailbox, which is described below. UMAC 110 preferably treats the high-RX-watermark signal as an interrupt signal, and preferably responds to it by emptying (reading) incoming MAC protocol-data units from the MAC_RX BUFFER. If the MAC_RX BUFFER is about to overflow during the regular running mode of media-access control unit 100 because UMAC 110 has not emptied the buffer in a timely manner, LMAC 120 will not overwrite the buffer, but will cease data transfer and generate an exception message through the messaging system (described below) to indicate an overrun condition to UMAC 110. The high-RX-watermark signal can take the form of a bit flag that is stored in the control block, with UMAC 110 periodically monitoring the flag's value.

TX CTRL BUFFER. For each downlink (DL) sub-frame, UMAC 110 groups the outgoing MAC PDUs for that sub-frame so that outgoing MAC PDUs with the same modulation method are transmitted in one or more bursts having the same burst profile. (As indicated above, the modulation method, and thus the burst profile, for an outgoing MAC PDU will generally depend upon the subscriber station to which the PDU is being sent.) UMAC 110 assembles a group of outgoing MAC PDUs to be sent in a common burst, stores those PDUs in the MAC_TX BUFFER, and then stores a corresponding transmission Burst Control Tag (TCT) in the TX_CTRL BUFFER. The TCT has a fixed number of words (i.e., is a fixed size), and specifies the transmission modulation method and transmission time for the burst that will transmit the stored outgoing MAC PDUs, as well as an indication of which MAC PDUs in the MAC_TX BUFFER to use for transmission. (The latter indication can be done in a number of ways, and one simple way is for the indication to provide the number of bytes stored in the MAC_TX BUFFER.) The TX_CTRL BUFFER preferably comprises a circular buffer having a fixed number of words, an input pointer IP that indicates the next memory location (i.e., address of the next memory word) for UMAC 110 to store a TCT for an outgoing burst, and an output pointer OP that indicates the next memory location for LMAC 120 to read a TCT for an outgoing burst. The pointers IP and OP for this buffer can be located in the control block. Upon startup, the pointers IP and OP are set to the same memory location. UMAC 110 places the TCT at the location indicated by pointer IP, and increments the value of the pointer by a number equal to the fixed size (in words) of the TCT. LMAC 120 reads a TCT for an outgoing burst starting at the location indicated by pointer OP only if the value of OP is different from the value of IP. LMAC 120 does this for each outgoing burst that it processes. An exemplary TCT includes the following fields: (1) an 11-bit field providing the transmission start time of the outgoing burst, given as the symbol number at which the transmission burst is required to start; (2) a 3-bit field providing a modulation code to indicate the type of modulation to be used for the burst; (3) an 18-bit field to indicate the total number of bytes to be transmitted in the burst (which enables LMAC 120 to read the correct number of MAC PDUs from the MAC_TX BUFFER for the burst); (4) a 24-bit field to provide a frame sequence number indicating which frame the burst belongs to (which enables LMAC 120 to ensure proper sequencing of the MAC PDUs); (5) a 4-bit field to indicate the type of burst (FCH burst, MAC-PDU burst, non-MAC PDU burst); (6) parameters for FEC-block encoding, and (7) various secondary parameters useful to the PHY-layer control unit, such as parameters for antenna selection, scrambling format, and preamble and midamble formats.

An exemplary sequence of actions for assembling MAC PDUs for transmission by the base station is now described. Prior to the start of each frame, the base-station UMAC 110 increments its frame sequence number, decides which MAC PDUs to send in the DL sub-frame based on the outgoing data packets that have been provided to it by the network-control layer NET and the levels of service required for the data packets, groups the outgoing MAC PDUs into outgoing burst groups, and assigns burst start times for the outgoing burst groups. It also decides how much uplink time to allocate to each subscriber station, and assigns burst start times for the subscriber-station bursts. From all of this, UMAC 110 generates the FCH, with the FCH's downlink frame prefix (DLFP) providing information on how the first number of bursts (up to four) that will follow the FCH burst of the downlink sub-frame are to be transmitted. UMAC 110 loads the FCH into the MAC_TX BUFFER and thereafter stores a TCT for the FCH in the TX_CTRL BUFFER, with the TCT having its 4-bit burst-type field set to indicate "FCH burst," which lets LMAC 120 know that the data for the FCH is to be specially processed (e.g., not sent as a regular MAC PDU). UMAC 110 also generates a DL-Map if it has more than four downlink bursts that follow the FCH burst for the downlink sub-frame, and also generates a UL-Map. The DL- and UL-Maps are in the form of MAC PDU messages. UMAC 110 stores them in the MAC_TX BUFFER, along with any other messages that need to go in the first burst after the FCH burst. It then generates a TCT for these PDUs, with an indication in the TCT that they are to be transmitted as the first burst following the FCH burst and with the TCT's 4-bit burst-type field set to indicate "MAC-PDU burst." UMAC 110 thereafter stores the TCT for the first burst in the TX_CTRL BUFFER. Then, for each remaining outgoing burst group, the base-station UMAC 110 generates the TCT for the group, stores the outgoing MAC PDUs of the group into the MAC_TX BUFFER, and thereafter stores the TCT for the burst group in the TX_CTRL BUFFER. The TCT for these bursts has its 4-bit burst-type field set to indicate "MAC-PDU burst." The base-station LMAC 120 thereafter reads each of the above TCTs from the TX_CTRL BUFFER, determines the number of outgoing MAC PDUs to read for the burst from the MAC_TX BUFFER from the field that indicates the number of bytes in the burst, ascertains the burst type for the burst (i.e., whether it is an FCH burst or MAC-PDU burst or other type of burst), and generates corresponding outgoing FEC blocks based on the modulation method, burst type, burst start time, and other parameters indicated in the TCT.

An exemplary sequence of actions for assembling MAC PDUs for transmission by a subscriber station is implemented somewhat differently, but has some of the above actions. For example, the UMAC for the subscriber station does not need to maintain a frame sequence number or generate FCHs, UL-maps, and DL-maps. Like the UMAC of the base station, the subscriber station UMAC 110 decides which MAC PDUs to send in the UL sub-frame based on the outgoing data packets that have been provided to it by the station's network-control layer NET and the associated levels of service for the data packets, and groups the outgoing MAC PDUs into one or more outgoing burst groups. Then, by the time the subscriber station has received and processed the downlink sub-frame, the subscriber-station UMAC 110 determines from the received UL-map which physical slot(s) it is to use to transmit its one or more burst(s) for the uplink sub-frame and the corresponding modulation method(s). Then, prior to the start of the uplink sub-frame, and for each outgoing burst group, the subscriber-station UMAC 110 generates the TCT for the group, stores the outgoing MAC PDUs of the group into the MAC_TX BUFFER, and thereafter stores the TCT for the burst group in the TX_CTRL BUFFER. The subscriber-station LMAC 120 thereafter reads the TCT from the TC_CTRL BUFFER, determines the number of outgoing MAC PDUs to read from the MAC_TX BUFFER from the field that indicates the number of bytes in the burst, and generates corresponding outgoing FEC blocks based on the modulation method, burst start time, burst type, and other parameters indicated in the TCT. For completeness, we note that a subscriber station must usually first request a bandwidth allocation from the base station before the base station can grant any transmission opportunities (via the UL-Map) to the subscriber station. The present inventions do not pertain directly to the actions involved in seeking bandwidth allocations and granting bandwidth allocations. Information on this can be found in the IEEE 802.16 Wireless Standard and at various websites on the Internet.

RX CTRL BUFFER. For base-station operations, a Receive Burst Control Tag (RBCT) is passed to LMAC 120 by UMAC 110 through the RX_CTRL BUFFER for each uplink burst that UMAC 110 expects to receive during the uplink sub-frame. An exemplary RBCT includes the following fields: (1) an 11-bit field providing the transmission start time, given as the symbol number at which the burst is expected; (2) a 3-bit field providing a modulation code to indicate the type of modulation of the expected burst; (3) an 18-bit field to indicate the total number of symbols in the expected burst; (4) a 24-bit field to provide a frame sequence number indicating which frame the expected burst belongs to (this enables LMAC 120 to ensure proper sequencing of the MAC PDUs); (5) parameters for the FEC-block encoding, and (6) various secondary parameters useful to the PHY-layer control unit, such as parameters for antenna selection, scrambling format, and preamble and midamble formats. In preferred embodiments, the RBCT further comprises an indication of the connection identifiers (CIDs) of the MAC PDUs that are to be in the expected burst. This indication may be provided in many ways, and a preferred way is for the RBCT to provide an index (e.g., address location) to a section of the CID table that has these CIDs. This speeds up the CID lookup process in LMAC 120 when the CID Table is very large in the base station. This can be efficiently done by organizing the CID table such that CIDs assigned to a particular subscriber station reside together as a contiguous group of CIDs. The RBCT preferably has a fixed size (e.g., 4 or 5 words), but may have a variable length, such as may be the case when the RBCT includes the actual CIDs of the MAC PDUs in the expected burst rather than an index. In the latter case, it is preferred that the RBCT include a field that indicates the size of the RBCT so that LMAC 120 can determine its size.

As indicated above, the base-station UMAC 110 generates an RBCT for each uplink burst that it expects to receive in the uplink sub-frame, with the RBCTs being stored in the RX_CTRL BUFFER. This buffer preferably comprises a circular buffer having a fixed number of words, an input pointer IP that indicates the next memory location (i.e., address of the next memory word) for UMAC 110 to store an RBCT for an expected incoming burst, and an output pointer OP that indicates the next memory location for LMAC 120 to read an RBCT for an expected incoming burst. The pointers IP and OP for this buffer can be located in the control block. Upon startup, the pointers IP and OP are set to the same memory location. UMAC 110 places the RBCT at the location indicated by pointer IP, and increments the value of the pointer by a number equal to the fixed size (in words) of the RBCT. LMAC 120 reads an RBCT for an expected incoming burst starting at the location indicated by pointer OP only if the value of OP is different from the value of IP. LMAC 120 does this for each expected incoming burst for each uplink sub-frame. The frame sequence numbers in the RBCTs can be used by LMAC 120 to correlate the expected incoming bursts with the incoming uplink sub-frames. As another way, LMAC 120 can presume that all RBCTs that it reads are for the upcoming or current uplink sub-frame, and UMAC 110 can defer storing the RBCTs for an uplink sub-frame until after the prior uplink sub-frame has finished. To facilitate this, UMAC 110 can receive and monitor a frame-synchronization signal generated by the PHY unit (shown as FRAME-SYNC SIGNAL in FIG. 5). This signal provides a pulse at the start of each frame. The signal is also provided to LMAC 120 to assist it in generating the FEC blocks. In preferred embodiments, the timing of this pulse is programmable, and can be set by UMAC 110 to compensate for the various overhead tasks that it performs.

The RBCTs are not used by the subscriber stations. Instead, the LMACs of the subscriber stations obtain the information needed to demodulate the bursts of the downlink sub-frames from the DLFP contents (which are carried by the FCH bursts) and the DL maps at the beginnings of the downlink sub-frames.

The RX STAT BUFFER holds information that LMAC 120 generates about the incoming bursts that it receives and about the incoming MAC PDUs that it processes. This information can be used by UMAC 110, as needed, such as to determine the quality of reception and whether there was an error during the burst acquisition. For each received burst, LMAC 120 generates a Received Burst Status Block (RSI) that indicates whether the burst was received and, if so, the length of the received burst (as measured in symbols) and an indication of whether any errors were encountered in the received data. The RSI also preferably has one or more measures of the strength of the signals present in the received modulation symbols and the degree of interference noise, and one or more measures of the degree to which the PHY layer was able to lock onto the burst's preamble. The RSI also preferably has an indication of whether the received burst is carrying ordinary MAC PDUs, an FCH burst, or a MAC-level management message between stations. The RSI may also have the starting location in the MAC_RX BUFFER for the MAC PDUs that were conveyed by the burst. The RSI has a fixed length, usually several words in length. For each received burst that is intended for the station, LMAC 120 can be configured by UMAC 110 to generate a Received MAC PDU Status Block (RSIP) that indicates the length of the PDU (in bytes). The RSIP has a fixed length, and can be as short as one word.

LMAC 120 places an RSI in the RX_STAT BUFFER for each burst that it receives, and if further configured, it places an RSIP in the RX_STAT BUFFER for each of the burst's MAC PDUs that is safely received and that has a CID in the CID table. In order for UMAC 110 to distinguish between RSIs and RSIPs, the first word of each RSI and RSIP has an identification field (located at the same bit locations in the RSI and RSIP) that indicates whether the word is the start of an RSI or an RSIP. The RX_STAT BUFFER preferably comprises a circular buffer having a fixed number of words, an input pointer IP that indicates the next memory location (i.e., address of the next memory word) for LMAC 120 to store an RSI or RSIP, and an output pointer OP that indicates the next memory location for UMAC 110 to read an RSI or RSIP. The pointers IP and OP for this buffer can be located in the control block. Upon startup, the pointers IP and OP are set to the same memory location. LMAC 120 places an RSI or RSIP at the location indicated by pointer IP, and increments the value of the pointer by the number of words in the RSI or RSIP, as the case may be. When the values of OP and IP are different, UMAC 110 reads the first word at the location indicated by pointer OP and looks at the RSI/RSIP identification field to determine whether an RSI or RSIP is present at the output of the buffer. It then reads any remaining words of the RSI or RSIP, and updates the value of output pointer OP by the total number of words read.

The Connection Identifier (CID) Table in memory 130 comprises a plurality of CID entries, each of which has a connection identifier (CID), a traffic-encryption field (TEF) and one or more flags associated with the CID to support various functions. If a connection has its MAC PDUs encrypted, then the traffic-encryption field for the connection's CID entry will have the index to the encryption key in the TEK table for the connection. (The TEK table is described below.) The CID table memory is initialized and updated by UMAC 110 to reflect changes in connections and their encryption status. When updating the CID table, UMAC 110 locks the table by using a CID table lock semaphore in the control block. Both base-station and subscriber-station LMACs may use the CID table memory to find the TEK keys for incoming MAC PDUs. Exemplary implementations of the CID table memory have 1024 CID entries.

Each subscriber-station LMAC 120 checks the CID of an incoming MAC PDU against the CID entries stored in the CID table memory to determine if the MAC PDU is intended for the subscriber station. The subscriber-station LMAC 120 is generally configured to pass only those incoming MAC PDUs to the UMAC when the PDU's CID is found in the subscriber station's CID table. This filtering based on CIDs reduces the burden on the subscriber station's UMAC 110. The LMAC 120 may be configured to drop an incoming MAC PDU if, at the time of an attempted CID search, the CID table is found to be locked by the UMAC 110. In the base station, it is advantageous to arrange the CID entries associated with a subscriber station together as a contiguous group in the table, with the memory location of the first CID entry in the group serving as the index to the group, or "group CID index." Thus, when the base-station LMAC processes the incoming MAC PDUs conveyed in an uplink burst from the subscriber station, it can begin its search in the CID table at the group CID index assigned to the subscriber station, rather than at the beginning of the table. This grouping increases the LMAC's efficiency in processing and decrypting the incoming MAC PDUs of the uplink bursts from the subscriber stations. As indicated above, the group CID index can be provided in the RBCT tag that the base-station UMAC 110 stores in the RX_CTRL BUFFER for each expected incoming burst.

For subscriber station applications, it would be useful to group the CIDs for a particular subscriber station such that there is a common bit pattern in the CIDs (such as having the same eight most significant bits being the same for all of the CIDs of a subscriber station). In this way, LMAC 120 can look at just the first byte of the CID of an incoming MAC PDU to determine if it belongs to the subscriber station. Assigning the CIDs to the subscriber stations would be left to the base station to do, but the CID table of MAC Unit 100 can be augmented to support this strategy. Specifically, we allow for the possibility that the base station will allocate CIDs such that the CIDs of each subscriber station share a common bit pattern in a preset group of the CID's bits (such as the most significant byte), and that the base station will inform each subscriber station of its assigned bit pattern, and that each subscriber station will store its assigned bit pattern as a "CID mask." Alternatively, UMAC 110 can scan the CID table and find the common pattern. The CID of an incoming MAC PDU may then be ANDed with subscriber-station's CID mask to see if there is a match. If not, the MAC PDU is discarded. If there is a match, the table is further searched if there is a need to obtain the TEK entry. After that, the MAC PDU is sent to UMAC 110.

To support the concept of CID masking, the CID table can be augmented to include a flag indicating whether an entry of the Table is a regular CID (with possible associated TEK entry) or a CID mask. The bits of the CID entry that are normally used to store the CID are instead used to store the CID mask. The CID mask is placed at the start of the CID table, and LMAC 110 searches this entry first to first test the incoming CID against all of its CID masks. We also allow for the possibility that the base station can assign multiple CID masks to a subscriber station. In this case, all of the CID masks are stored at the start of the CID table. We also allow for the possibility that the base station will assign CID masks that have variable lengths and variable positions. For this, the data bits of the CID entry normally used to store the index to the TEK table may instead be used to indicate the number of bits in the CID mask, and location of the CID mask. Finally, we also allow for the case where UMAC 110 can scan through the CID table to find common bit patterns among the CID entries, and thereafter construct a list of CID masks itself and place them at the start of the CID table.

Traffic Encryption Key (TEK) Table Memory. The MAC PDUs for a given connection may be encrypted using AES (Advanced Encryption Standard) or DES (Data Encryption Standard). The decision of whether to encrypt a connection is passed to media-access control unit 100 by the network-control layer NET, along with the selected encryption standard, key, and any initialization vector. The TEK Table memory holds Traffic Encryption Keys (TEKs) for the connections and is maintained by UMAC 110. For the AES standard, the TEK is 16 bytes long; for the DES standard, the TEK and an initialization vector occupy 16 bytes in total. To facilitate implementations of the IEEE 802.16 Wireless Standard, the TEK table memory is arranged to allow two TEKs to be grouped together, the pair being called a "TEK entry." (This standard allows a base station to establish a security association between a subscriber station that may be used by one or more downlink connections and one or more uplink connections, where one of the two keys of the TEK entry is primarily used to encrypt downlink traffic and the other is primarily used to encrypt uplink traffic; more on this is provided in the next paragraph.) A key index (e.g., memory address) is provided for each TEK entry of the table memory; it is a pointer (i.e., address) to the memory location of the TEK entry, and is generally less than a byte in length. The small size of the key index enables UMAC 110 to readily pass it to LMAC 120, which can then retrieve the TEK entry with the key index. As described below in greater detail, for transmitting an outgoing MAC PDU, UMAC 110 can pass a key index for the outgoing PDU to LMAC 120 in the HCS field of the PDU (see FIG. 4 for the location of the HCS field). The HCS field is unused at the time, and this inventive feature saves LMAC 120 from reading the CID from the MAC header and thereafter searching through the CID table in order to retrieve the corresponding TEK entry from the TEK table, and thereby reduces LMAC 120's overhead for transmission operations. When receiving an incoming MAC PDU, LMAC 120 can obtain the key index for the PDU by way of the CID found in the PDU and the CID table, and then look up the TEK entry using the key index. In other words, LMAC 120 reads the CID of the incoming MAC PDU, looks up the key index for that CID in the CID table, and then looks up the TEK entry corresponding to the key index. Depending upon the EKS encryption field of the MAC-PDU header (see FIG. 4), LMAC 120 uses either the first or the second TEK of the TEK entry, as described in the IEEE 802.16 Wireless Standard. It is the responsibility of UMAC 110 to update the TEK table memory in a timely manner and to maintain the correlation between the TEK table memory and the CID table memory (discussed below). It is also the responsibility of UMAC 110 to timely update the first and second TEKs of an entry. Exemplary implementations of the TEK table memory have 128 TEK entries, which can be represented by the 7-bits of the key index passed in the HCS field.

The EKS (Encryption Key Sequence) field in an ordinary MAC PDU header indicates which TEK of the TEK entry is going to be used for encryption or decryption of that particular MAC PDU. The EKS field can assume values from 0 to 3, inclusive. If the EKS field is 0 or 2, the first TEK of the TEK entry is employed. If the EKS field is 1 or 3, the second TEK is employed. The IEEE 802.16 Wireless Standard defines four possible values for the EKS field but mandates the use of only 2 TEKs per connection. This is the reason for the above rotation scheme. It is possible that a maximum of four TEKs can be used for a connection. In this case, UMAC 110 can update the first TEK after EKS has become 1 and before it becomes 2, and can update the second TEK after EKS has become 3 and before it becomes 4.

DIUC Table Memory. As indicated above, each downlink burst and each uplink burst can be transmitted according to a number of "burst profiles," with each burst profile comprising a modulation method and a set of configuration parameters for generating the FEC blocks. With each DLFP (in the FCH) and each DL-map (if present) in the initial bursts of a downlink sub-frame, the base station sends a 4-bit Downlink Interval Usage Code (DIUC) for each remaining burst in the downlink sub-frame. Each station maintains a correspondence between each DIUC in use and the burst profile currently assigned to it. The assignment of burst profiles to the DIUC codes is managed by the base station, and is periodically communicated to the subscriber stations in a Downlink Channel Descriptor (DCD) message, along with a corresponding 8-bit DCD count in the DCD message. The DCD count that is placed in a DCD message is incremented by one with respect to the DCD count that was in the prior DCD message (and changes from 255 to zero when a DCD count of 255 is incremented). For each frame, the base station also transmits within the DL-map the DCD count that corresponds to the DIUC assignments that it will use to transmit the bursts of the frame's downlink sub-frame. In response to receiving a DCD message, the subscriber stations update their assignments of burst profiles to DIUC codes after the base station changes over to the new DIUC assignments, which can be detected by looking for a change in the DCD count in the DL-map. To facilitate a changeover, the base station transmits a new DCD message, but continues to use the prior DIUC assignments and prior DCD count in the DL-map for a preset duration known as the DCD transition interval (which can be 2 or more frames) after the new DCD message. Then, the base station switches to the new DIUC assignments and provides the new DCD count in the DL-map.

To facilitate the changeover for subscriber stations in a manner that prevents an update error, MAC unit 100 comprises two DIUC tables in shared memory 130 to store the assignments of burst profiles: a Main DIUC Table (MDT) and an Alternate DIUC Table (ADT). Each table can include the DCD count on which it is based. The subscriber-station LMAC 120 always uses the MDT, while the ADT is used to process updates that are sent in DCD messages from the base station. Specifically, the subscriber-station UMAC 110 immediately updates the ADT (i.e., before the DCD count is changed in the DL-maps) whenever it receives a DCD message from the base station. The exact time point that the base station transitioned to the new assignments of burst profiles to DIUCs does not need to be known by the UMAC 110. The subscriber-station LMAC 120 monitors the value of the DCD count provided in the DL-maps, and starts using the updated assignment of burst profiles to DIUCs by copying the contents of the ADT onto the MDT when it detects a change in the DCD count provided in the DL-map. The copying is done as soon as the DL-map is decoded and before the start of the next burst in the downlink sub-frame. From this point on, the ADT is free to be updated by the subscriber-station UMAC 110 in response to the next DCD message from the base station. It is the responsibility of the subscriber-station UMAC 110 to keep the ADT updated based on DCD messages from the base station. During startup, the subscriber-station LMAC 120 preferably initializes both the MDT and ADT tables with default values suggested by the IEEE 802.16 standard. Employing the alternate DUIC table (ADT) according to this invention of the present application ensures a smooth transition of the DIUC information and prevents possible data loss due to a DCD update.

The UMAC/LMAC MESSAGING SYSTEM handles the non-traffic communications between the UMAC and LMAC processors, including exceptions and configuration directives. The messaging system comprises a UMAC mailbox to store messages for the UMAC processor that are sent by the LMAC processor, an LMAC mailbox to store messages for the LMAC processor that are sent by the UMAC processor, a UMAC-message-waiting signal that signals to the UMAC that its assigned mailbox has a message, and an LMAC-message-waiting signal that signals to the LMAC that its assigned mailbox has a message (FIG. 7). Each mailbox comprises a plurality of memory words, with an exemplary mailbox having enough memory words for one message. An exemplary message comprises a message header, which conveys an identification of the memory, and a payload of data related to the purpose of the message, if needed. In constructed embodiments, the message header comprises a word, and the payload comprises four words. One byte of the message header is used as a class field to indicate the class of the message, which is useful for grouping messages according to function or control level, and another byte is used as an identifier field to indicate the identity of the message. Some messages require that a response message be generated by the receiver and sent back to the originator. For this, the message header includes a 1-bit field (the Response Bit) to indicate that the message is a response message. When a receiver has to respond to a message, it copies the original message header to a new message header for the response message, changes the 1-bit field from 0 to 1 to indicate that the message is a response message, loads any needed data into the payload section of the new message, and thereafter sends the new message to the originator. Thus, the response message that gets sent back contains the class and identity fields of the original message so that the originator can easily correlate the response message to its initial message and use the data in the payload of the response message to address the issue that initiated the need for the original message. Sometimes a receiver may receive a message from the originator that is invalid or irrelevant. In this case, it is useful for the receiver to send the message back to the originator with an indication that the message is either invalid or irrelevant. For this, the message header has a 1-bit field (Invalid bit) to indicate that the message is being returned to the originator for being invalid or irrelevant. When a receiver receives an invalid or irrelevant message, it copies the original message header to a new message header, changes the 1-bit field (Invalid bit) from 0 to 1 to indicate that the received message was invalid or irrelevant, optionally copies the payload of the original message to the payload of the new message, and thereafter sends the new message to the originator. Thus, the originator receives back its original message as being marked invalid or irrelevant, with the class and identity fields of the original message so that it can readily determine which of its messages was not processed by the receiver.

In preferred embodiments, a mailbox-locking mechanism is used for handshaking between the message originator and the receiver. For any message, a receiver mailbox is always locked by the originator and unlocked by the receiver, and the receiver always unlocks its mailbox after reading the message in its mailbox. The lock indicators are shown in FIG. 6 in the boxes marked "LOCK," and each lock indicator may be implemented with a little as one bit of memory storage, but is generally implemented as a word to facilitate fast address accessing. In either case, a value of "0" may be used to indicated an unlocked state, and a value of "1" may be used to indicate a locked state. The lock indicators may be stored with the mailboxes, or may be placed in the control block. Before sending a message, the originator first checks the receiver's mailbox lock indicator. If the receiver's mailbox is unlocked, which indicates that the receiver has read the previous message and is free to receive a new message, the originator writes its message to the receiver's mailbox, sets the lock indicator to indicate that the mailbox is locked, and activates the appropriate message-waiting signal (either the UMAC-message-waiting signal or the LMAC-message-waiting signal). If, instead, the lock indicator shows that the receiver's mailbox is locked, which means that the receiver has not yet read the previous message, the originator discards its message and takes other action, if needed. (The other action may include resending the message after a period of time.) This ensures that the message waiting in the mailbox is never overridden by another message. When a receiver sends a response message back to the originator, it first checks the originator's mailbox lock indicator. If the originator's mailbox is unlocked, the receiver writes the response message to the originator's mailbox, sets the lock indicator to indicate that the mailbox is locked, and activates the appropriate message-waiting signal (either the UMAC-message-waiting signal or the LMAC-message-waiting signal). If, instead, the lock indicator shows that the originator's mailbox is locked, the receiver discards its message and takes other action, which may include resending the response message after a period of time.

When LMAC 120 discards a message because the UMAC mailbox is locked, LMAC 120 increments a counter called the Dropped Message Counter, which is shown as box DMC in FIG. 6. If UMAC 110 cannot empty its mailbox fast enough, it can check the DMC counter to see if any messages from LMAC 120 have been lost. In order to minimize the number of dropped response messages, the originator (e.g., UMAC 110) can first check its mailbox and clear it, if full, before sending its message to the receiver (e.g., LMAC 120). In preferred embodiments, there is no message queuing and only one message per direction can exist at a given time. Each message also receives a response message indicating that another message may be sent.

Control Block. All of the buffer pointers (IP and OP pointers) and mailbox lock indicators are preferably implemented in the control block, which is preferably constructed to provide fast and direct access to both UMAC 110 and LMAC 120. Having described the components of shared memory 130 (FIGS. 5 and 6) and how UMAC 110 and LMAC 120 interact with the components via their instruction sets, we now turn to describing inventive features of UMAC 110 and LMAC 120.

LMAC Generation of HCS Values We now discuss various features of UMAC 110 and LMAC 120. Referring to FIG. 4, when UMAC 110 passes outgoing MAC PDUs to LMAC 120, it passes them without computed HCS values, and without computed CRC values. The HCS (header check sequence) is an eight-bit field used to detect errors in the MAC header, and the CRC (cyclic-redundancy check value) is a four-byte field used to detect simple errors in the MAC PDU. LMAC 120 then calculates the HCS value based on the first five bytes of the outgoing MAC header, and inserts the result into the HCS field, which is the sixth and last byte of the MAC header. In preferred embodiments, LMAC 120 passes the first five bytes of the MAC header to its HCS engine, which computes the HCS and returns it to LMAC 120. Various network standards define how the HCS is to be computed. It is within the ability of one of ordinary skill in the art to construct an HCS engine to compute the HCS value, or to construct a set of instructions that direct LMAC 120 to compute it itself, such as when LMAC is implemented by a microprocessor or equivalent. Because the HCS computation is relatively compact, an exemplary HCS engine may be implemented as a state machine with a plurality of storage latches, and with a data path to accept the first five bytes of the MAC header and to provide the computed HCS values. The IEEE 802.16 Wireless Standard defines the computation for the HCS value, and one of ordinary skill in the art is directed to the Standard for specific information. As a general overview, the Standard specifies the HCS value as the remainder of the division (Modulo 2) by the generator polynomial $g(D)= D^8+D^2+D+1$ of the polynomial $D^8$ multiplied by the content of the header excluding the HCS field.

LMAC Generation of CRC Values. After LMAC 120 computes the HCS value and inserts it into the outgoing MAC header, LMAC 120 looks at the CI bit (FIG. 4) of the MAC header to ascertain whether a cyclic-redundancy-check (CRC) value is to be computed for the outgoing MAC PDU. The CRC value is based on the completed MAC header and the payload of the outgoing MAC PDU, if present. If the CI bit is set, LMAC 120 computes the CRC and inserts the result into the CRC field of the outgoing MAC PDU, which is the last four bytes of the PDU, and which may be initially passed to LMAC 120 by UMAC 110 in blank form. In preferred embodiments, LMAC 120 passes the header and any payload of the outgoing MAC PDU to its CRC engine, which computes the CRC and returns it to LMAC 120. Various network standards define how the CRC is to be computed. It is within the ability of one of ordinary skill in the art to construct a CRC engine to compute the CRC value, or to construct a set of instructions that direct LMAC 120 to compute it itself, such as when LMAC is implemented by a microprocessor or equivalent. Because the CRC computation is relatively compact, an exemplary CRC engine may be implemented as a state machine with a plurality of storage latches, and with a data path to accept the bytes of the MAC header and payload in serial form and to provide the computed CRC values. The IEEE 802.16 Wireless Standard defines the computation for the CRC value, and one of ordinary skill in the art is directed to the standard for specific information.

Passing of Encryption Keys As mentioned above, UMAC 110 passes an outgoing MAC PDU to LMAC 120 without a computed HCS value. When the payload of an outgoing MAC PDU does not require encryption, the HCS may be left blank. When the payload of an outgoing MAC PDU does require encryption, UMAC 110 preferably places an encryption-type value and a key index in the HCS field, and sets the EC bit (FIG. 4) of the PDU's header. The encryption-type value is preferably 1 bit in length and specifies whether DES or AES encryption is to be used (e.g., 0 for DES and 1 for AES, or vice versa). The key index, which is preferably 7 bits in length, provides the address location in the TEK table memory (in shared memory 130 shown in FIG. 5) to the TEK entry that is to be used to encrypt the outgoing MAC PDU. The organization and management of the TEK table was described above. LMAC 120 first looks at the EC bit of the MAC header to determine if the outgoing MAC PDU requires encryption. If so, it then reads the encryption-type value and key index from the HCS field and temporarily saves them while it computes the header's HCS value and inserts it into the last byte of the MAC header. Then, LMAC 120 encrypts the payload of the outgoing MAC PDU according to the selected encryption type and TEK entry indicated by the key. Various network standards define how the payload is to be encrypted, and whether a message-integrity code (MIC), also called message-authentication code (MAC) is to be computed. The computation of such message integrity/authentication codes is generally based upon both the payload and the header. In preferred embodiments, LMAC 120 passes the header and payload of the outgoing MAC PDU to its DES engine or AES engine, depending upon the encryption-type value. The selected encryption engine returns an encrypted payload and a message integrity/authentication code (if required by the Standard) to LMAC 120. Once the payload has been encrypted, any message integrity/authentication code is added to the encrypted payload, and LMAC 120 then proceeds to compute the CRC (if required) using the MAC header and the encrypted payload. In view of the present disclosure, it is within the ability of one of ordinary skill in the art to construct respective sets of instructions that direct UMAC 110 and LMAC 120 to perform the above tasks.

It is also within the ability of one of ordinary skill in the art to construct a DES engine and an AES engine to encrypt a variable-length payload and to generate a message integrity/authentication code, or to construct a set of instructions that direct LMAC 120 to do these tasks itself, such as when LMAC is implemented by a microprocessor or equivalent. The encryption engines may be implemented as state machines or equivalents thereof, with a data path to accept the bytes of the MAC header and payload in serial form, and to provide the encrypted payload and message integrity/authentication code. The IEEE 802.16 Wireless Standard specifies details of the encryption, and one of ordinary skill in the art is directed to the standard for specific information. In addition, one of ordinary skill in the art may find hardware implementations of DES and AES engines on the Internet at www.opencores.org, and similar open-hardware sites.

CID Filtering in Subscriber Stations. When receiving a MAC PDU, the LMAC 120 for a subscriber station first checks the connection identifier in the CID field of the MAC PDU header to determine if the MAC PDU is intended for the subscriber station. For this, it compares the PDU's CID against the CIDs stored in the CID table memory and only sends the incoming MAC protocol-data unit to the first processor when it finds the communication identifier in the storage memory. If the CID is not found in the table memory, no further processing is done on that particular MAC PDU and the PDU is discarded. The LMAC 120 in a base station does not normally perform CID filtering. In view of the present disclosure, it is within the ability of one of ordinary skill in the art to construct a set of instructions that direct LMAC 120 to perform the above tasks.

DL-MAP Parsing in Subscriber Stations. LMAC 120 handles the task of reading the DL-Map (if present) from the first burst following the FCH burst of a downlink sub-frame to ascertain the information needed to demodulate the remaining bursts in the downlink sub-frame. For this, it scans the incoming FEC blocks to identify the frame header and downlink map of each incoming frame, and it obtains therefrom the start times and modulation formats (i.e., DUIC codes) of the one or more remaining bursts in the incoming frame. Then, before each remaining incoming burst is to start, LMAC 120 outputs commands on an interface bus coupled between itself and the physical-layer control unit to instruct the physical-layer control unit regarding when (start time) and how (modulation format) to demodulate the next incoming burst. As an option, LMAC 120 may convey the DL-Map to UMAC 110 by placing the MAC PDU for it in the MAC_RX BUFFER. (In any event, it always passes up the UL-map and any other messages following it.) If a downlink frame does not contain a DL-Map, LMAC 120 then identifies the DLFP from the incoming FEC block, and obtains therefrom the start times and modulation formats (i.e., DUIC codes) of the one or more remaining bursts. LMAC 120 then instructs the physical-layer control unit in the manner described above. In view of the present disclosure, it is within the ability of one of ordinary skill in the art to construct a set of instructions that direct LMAC 120 to perform the above tasks.

Figure 8:
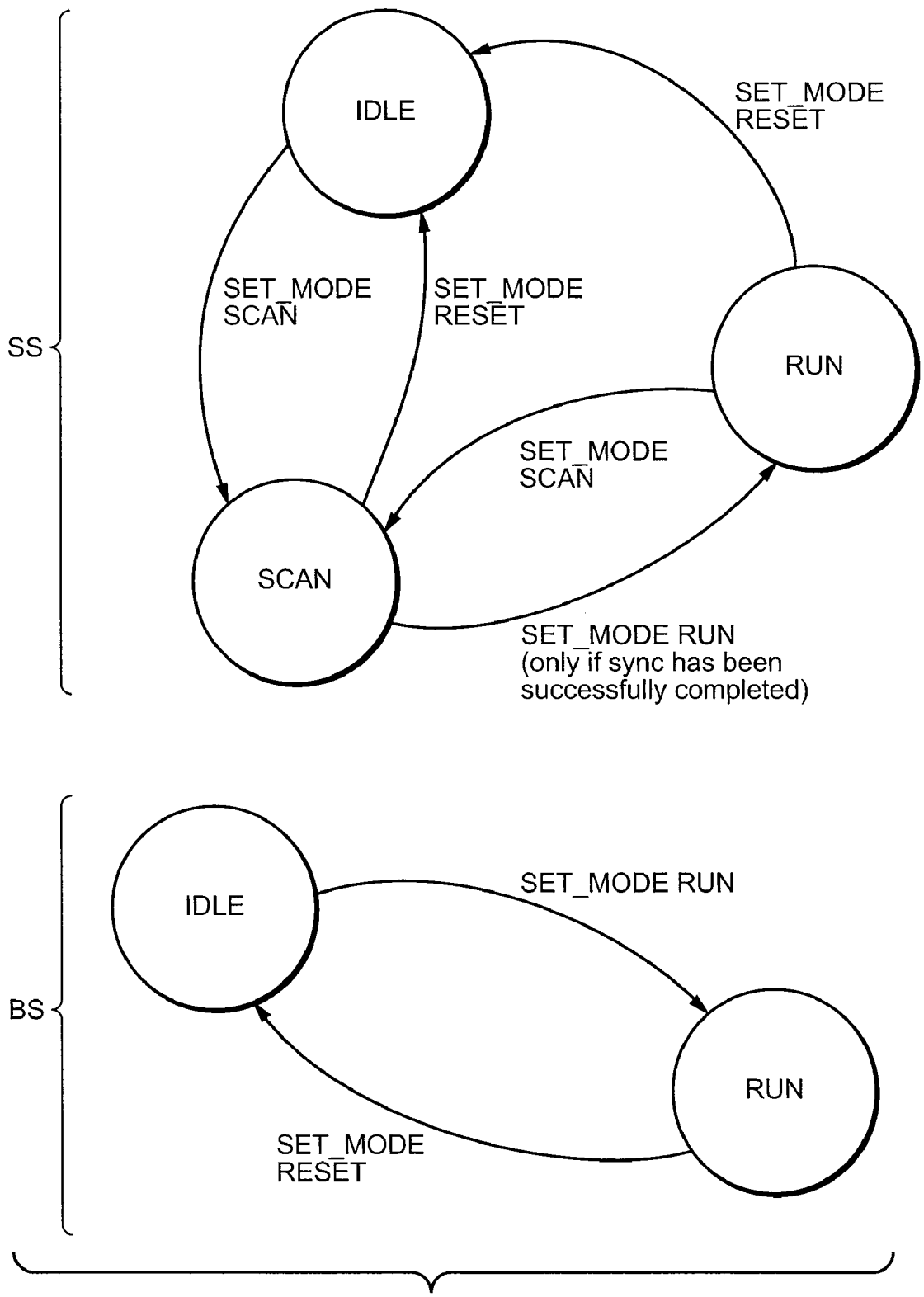
FIG. 8 illustrates exemplary operating modes of the preferred embodiments of LMAC processor for both subscriber-station and base station operations according to the present invention.

Operating Modes of UMAC 110 and LMAC 120. As indicated above, preferred embodiments of LMAC 120 include the following three operating modes: "Idle Mode," "Scan Mode," and "Run Mode." FIG. 8 illustrates these operating modes of the preferred embodiments of LMAC 120 for both subscriber-station and base station operations, and the allowable transitions between modes. The Idle mode is the first mode automatically entered right after the startup. Upon boot-up, LMAC 120 clears and initializes all data structures, IPs, and OPs, LMAC 120 sends a hardware-reset signal to the physical-layer control unit, sends a "READY" message indicating the arrival at the Idle mode to UMAC 110 through the messaging system, which was described above. It then waits in the Idle mode until it receives an instruction to enter either the Scan Mode or the Run Mode. UMAC 110 should write all watermark levels and configuration words after receiving the READY message from LMAC 120. In the Idle mode, LMAC 120 does not pass traffic, it only processes messages sent by UMAC 110 through the messaging system. For subscriber-station applications, UMAC 110 sends a "SET_MODE SCAN" message to LMAC 120 to start LMAC 120 in the Scan Mode. For base station applications, UMAC 110 sends a "SET_MODE RUN" message to LMAC 120 to start LMAC 120 in the Run Mode. In subscriber-station applications, before sending the "SET_MODE RUN" message, UMAC 110 must first determine from the RSI status messages sent by LMAC 120 whether LMAC 120 and the physical control unit have successfully synchronized to the base station's frame transmissions.

The Scan Mode for LMAC 120 is used only in subscriber-station implementations, and it provides an initial synchronization to a base station. Before UMAC 110 instructs LMAC 120 to enter the Scan Mode, it preferably initializes various parameters related to the acquisition of the transmission frames from the base station, such as the cyclic-prefix (CP) length, the frame length, etc., if known, via messages sent through the messaging system. This information may be stored in the control block of shared memory 130 or other locations within the memory, and UMAC 110 may update the memory directly or instruction LMAC 120 to do so through instruction messages. In the SCAN mode, LMAC 120 makes an attempt to locate and synchronize with an incoming service signal using the physical-layer control unit. In Scan Mode, LMAC 120 typically determines the correct cyclic prefix length used in the frame (if not known), and acquires the Frame Control Header (FCH) and other relevant bursts based on this FCH, and passes all relevant data to UMAC 110 along with status information, allowing UMAC 110 to judge whether or not to move to the Run Mode. If the correct cyclic prefix length for the particular installation is known, UMAC 110 can pass this information to LMAC 120 using the "SET-CPLEN" message, before starting the Scan Mode. In this case, the hunt for the cyclic prefix length will be shortened and the system start-up time may be reduced. (The cyclic prefix and the hunting process are described in greater detail below.) The frame length can also be initialized by UMAC 110, if known, using the SET_FRLEN message. Otherwise, the exemplary LMAC 120 starts with the maximum frame length allowed under the networking standard, and UMAC 110 can eventually discover the correct frame length by processing the DCD message that are periodically broadcasted by the base station and passed to it by LMAC 120. (Starting with the maximum frame length ensures that LMAC 120 will receive everything in one single frame. Once the frame length is discovered by UMAC 110 from a DCD message, it sends the correct frame length to LMAC 120 so that it can receive all of the frames in succession, without skipping over any frames.) In preferred embodiments, during Scan Mode, LMAC 120 continuously sends all relevant data and status information to UMAC 110, to support the initial network entry process running on the UMAC 110. UMAC 110 will also be able to determine the correct frame length, if not already known, and pass it to LMAC 120 using the SET_FRLEN message. When synchronization is achieved and all the relevant information is gathered, UMAC 110 sends a SET_MODE RUN message and LMAC will then move on to the Run Mode. (Finally, we note that in Scan Mode of a subscriber station, this high-RX-watermark signal interrupt is preferably used to urge UMAC 110 to read RSIs from the RX_STAT_BUFFER.)

Figure 9A:
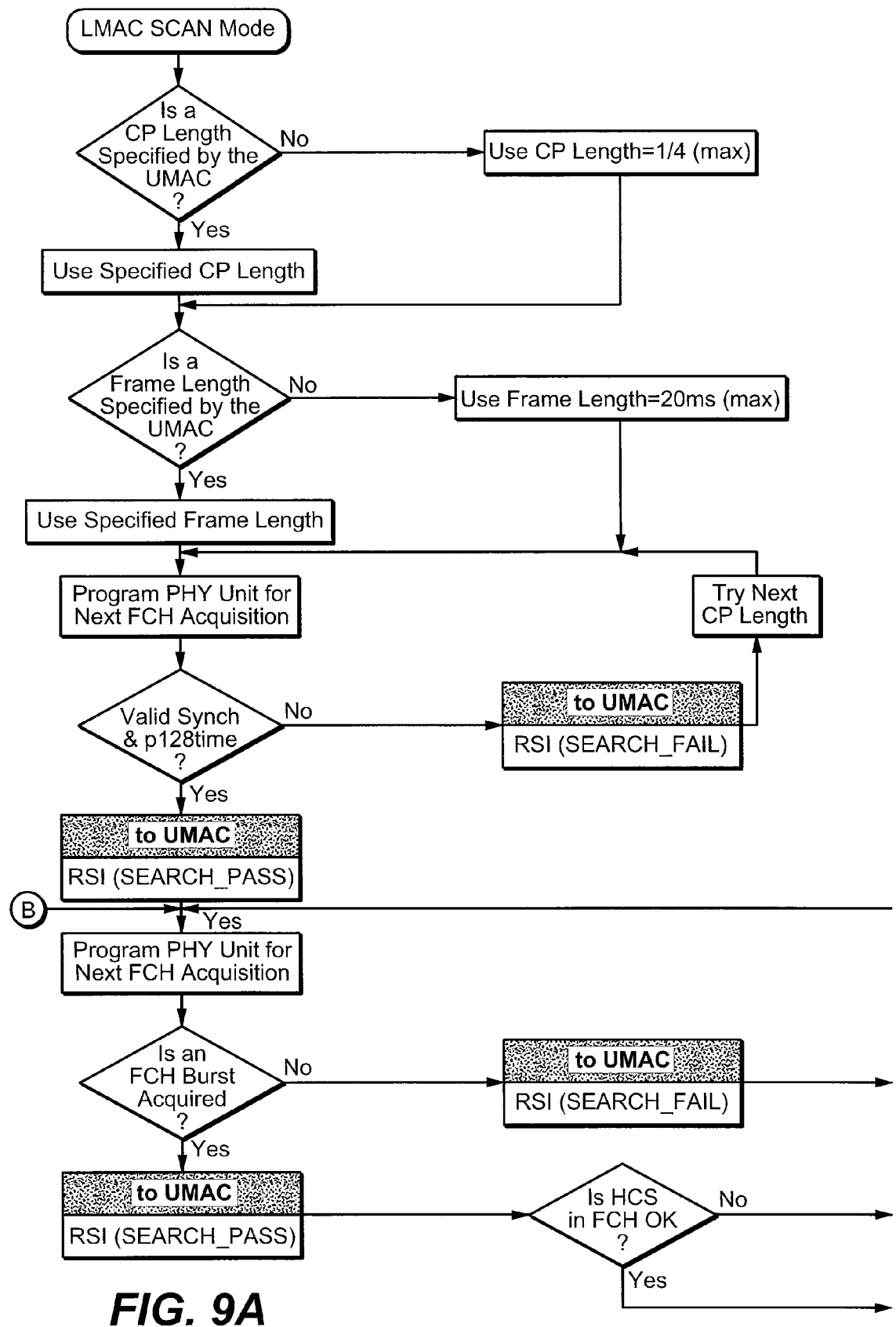
FIG. 9 is a flow chart of exemplary tasks for the Scan Mode performed in an exemplary order according to the present invention.
Figures 9, 9B:
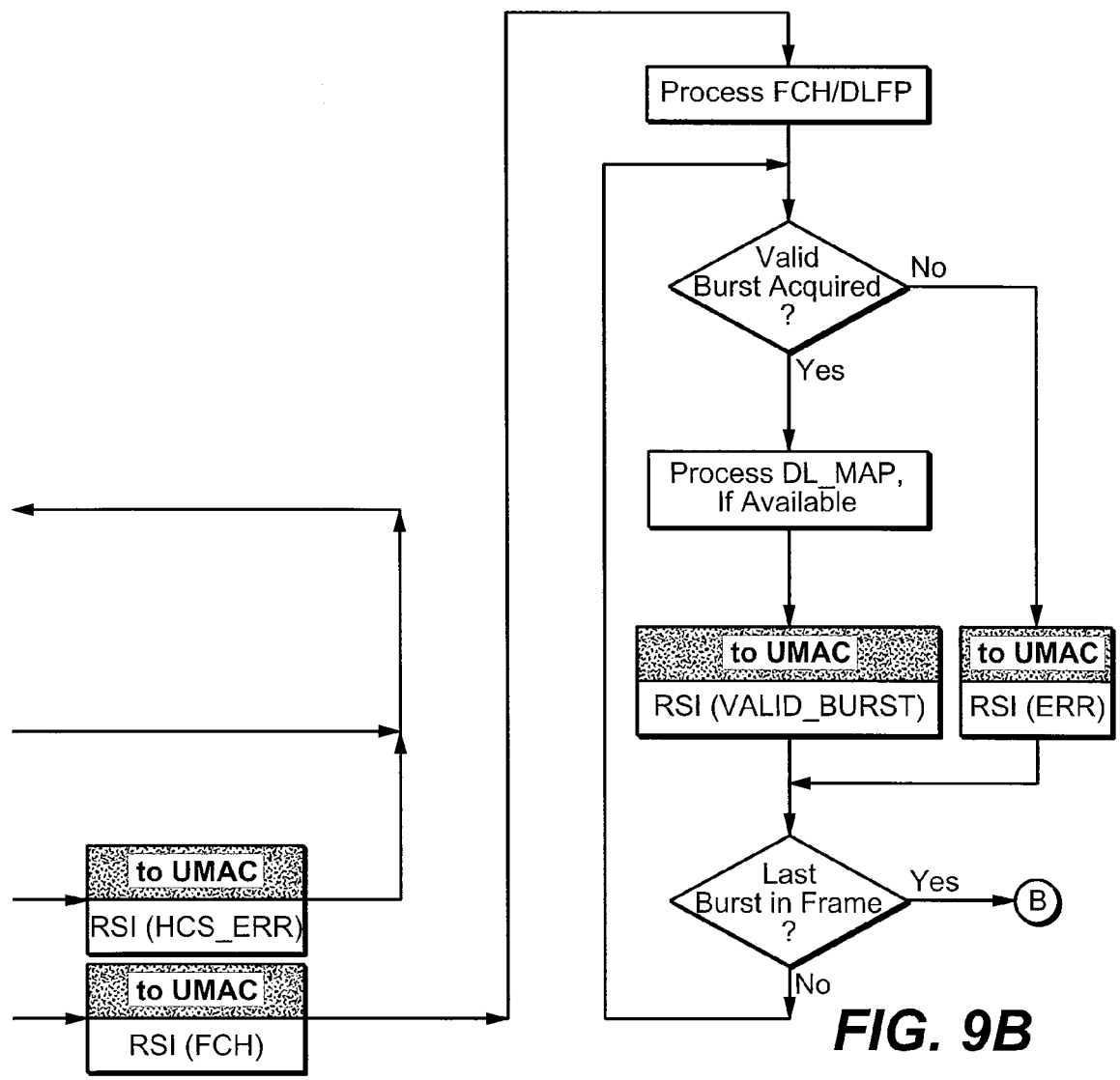

To complete the description of the Scan Mode, FIG. 9 shows a flowchart of exemplary tasks for the Scan Mode done in an exemplary order. The flowchart is self-explanatory to one of ordinary skill in the networking art, and a detailed discussion thereof is not needed to make and use the present inventions described herein. Note that this flowchart does not necessarily depict the easiest or the most efficient way to implement the SCAN mode. Other implementations may vary in one or more respects, such as by combining some of the processing loops. In the Scan Mode, LMAC 120 can also ascertain the base station identifier (BSID) from the frame control header burst, and pass this information to UMAC 110 to verify that MAC Unit 100 has connected to the correct base station. As another approach, UMAC 110 may pass the BSID of the base station to LMAC 120 so that LMAC 120 checks the BSID ascertained from the frame control header bursts to ensure that it synchronizes to the desired base station.

In the Run Mode, LMAC 120 transfers traffic between UMAC 110 and the physical layer control unit, as already discussed above. LMAC 120 is placed in this mode by a SET_MODE RUN message from UMAC 110, as discussed above. The RUN mode can be terminated by UMAC 110 by a mode change message (SET_MODE RESET or SET_MODE IDLE), either putting LMAC 120 into the Idle mode [for both BS and SS applications] or the Scan mode [for SS applications] again.

In view of the above disclosure, it is within the ability of one of ordinary skill in the networking art to construct sets of instructions that direct LMAC 120 to perform its above exemplary tasks in the above modes of operation, and to construct sets of instructions that direct UMAC 110 to perform its above exemplary tasks in the above modes of operations.

Methods of Synchronizing a Subscriber Station in Scan Mode. Every subscriber station (SS) needs to tune in and listen to the frames broadcast by the base station (BS) during the regular operation of the network. By going through the Scan Mode, which is a special mode designed to simplify the network entry process, the subscriber station subscriber station ensures that the base-station signal has been located and frame control headers have been successfully received and locked onto, prior to starting the processing of regular data traffic (e.g., Run Mode). Among the additional tasks performed during the Scan Mode are identifying the cyclic-prefix (CP) length and the frame length, if not already known. The cyclic-prefix length and frame length are two important capacities, which must be known before any regular operation can occur. The cyclic prefix is a special portion at the beginning of an OFDM symbol, and is added mainly to improve the immunity of the OFDM signal to multipath signals. The cyclic-prefix length defines the length of the cyclic prefix portion of an ordinary OFDM symbol in terms of number of clock cycles of the sampling clock (also called digitizing clock) that it spans, or in other words, the cyclic-prefix length is the number of "samples" that the cyclic-prefix spans in the OFDM symbol. An OFDM symbol comprises the cyclic prefix and 256 samples of data. The IEEE Std 802.16-2004 defines four possible values for cyclic-prefix length. These are 8, 16, 32 and 64 samples. As a result, an OFDM symbol could have a total of 264, 272, 288 or 320 samples, depending on the cyclic-prefix length in use. The cyclic-prefix length is a constant number chosen per deployment and never changes in time.

The frame length is a measure of the time duration of one single frame broadcast by the base station. The IEEE 802.16-2004 Wireless Standard defines several standard frame lengths ranging from 2.5 ms to 20 ms. The base station broadcasts a frame control header (FCH) burst at regular intervals, marking the beginning of every frame. It is essential for the LMAC (or MAC in general) to know the cyclic-prefix length to be able to program the PHY unit in order to strip the cyclic prefix from the incoming OFDM symbols. It is also essential for the LMAC (or MAC in general) to know the frame length to be able to program the PHY unit so as to receive FCH bursts at the regular intervals and all other bursts contained in the rest of each frame.

If the UMAC 110 has the knowledge of cyclic-prefix length and the frame length used in that particular deployment, then it sets these values by sending "SET_CPLEN" and "SET_FRLEN" messages to LMAC 120. This will help shorten the time that LMAC 120 spends in the Scan Mode. The cyclic-prefix length can be surmised from the base station's signal by an exemplary method for the LMAC Scan Mode described below. In this case, UMAC 110 doesn't have to set the cyclic-prefix length as it will automatically be found by LMAC 120. If not known, the frame length can only be extracted from a DCD message broadcast by the base station. Processing the DCD message is one of UMAC 110 responsibilities, and it preferably sends the correct frame length, once it's known, by sending a "SET_FRLEN" message to LMAC 110 to ensure correct operation.

Referring to FIG. 9, we now describe an exemplary method for the LMAC Scan Mode. As a first step, assuming that the frame length and the cyclic-prefix length are not known, the method starts with the maximum frame length, which is 20 ms, and the longest cyclic-prefix length, which is 64 samples. The IEEE Std 802.16-2004 mandates that the transmission of an FCH burst must be preceded by a long preamble. As the next step, the method programs the PHY unit to look for a long preamble. A long preamble occupies two OFDM symbols. The PHY unit is designed in such a way that it will detect a long preamble even with an incorrect setting of cyclic-prefix length. If the acquisition of a long preamble fails, the method repeats this step until a long preamble is successfully acquired. The successful acquisition of a long preamble is called "synchronization," or "synch" for short.

As the next step, if the acquisition of a long preamble is successful, the method reads a parameter from the PHY unit called the p128-time value. The p128-time value gives the location of a matched filter maximum hit of the preamble; that is to say, the p128-time gives the number of samples measured from the start of the OFDM symbol (in which the preamble was found) to the sample location in the symbol where the start of the preamble was found. The matched filter is implemented as a part of PHY unit, and is 64 taps long. It is matched to the first 64 samples of the repeating 128 samples in the preamble. Therefore, there could be a hit on either one of the two 128-sample long sequences that make up the long preamble. The expected value of p128-time value is therefore either (CP_Length+64) or (CP_Length+64+128). In practice, there is no way to know which point (+64 or +64+128) has matched in the filter. The exemplary method, as can be implemented by LMAC 110, uses the closest point for comparison. In other words, if the assumed cyclic-prefix length is 8, then the method compares the p128-Time value with 72 (which is 8+64) or 200 (which is 8+64+128). If either comparison holds true, then the method (and LMAC 110) infers that the cyclic-prefix length was indeed 8. If neither comparison yields true, then the method uses the next cyclic-prefix length and iterates the above process on more time. When all the cyclic-prefix lengths (i.e. 8, 16, 32 and 64) were tried and no match has been found, the whole process is repeated starting from a cyclic-prefix length of 8 and working upwards through 16 and 32 until a preset time out period elapses. When testing for match conditions, the following tolerance windows may be used: −3 samples to +4 samples when the test CP length is 8, −3 to +8 samples when the test CP length is 16, −7 to +16 samples when the test CP length is 32, and −15 to +32 samples when the test CP length is 64.

The cyclic-prefix length has now been determined. As the next step, the method determines the frame duration. This is contained in the frame duration code in the DCD which is transmitted periodically by the base station. If the current downlink sub-frame does not contain the DCD then a new search is initiated for the next frame. The process continues until a DCD message is found. LMAC 120 does not process DCD message but it passes it on to the UMAC 120, which then processes it to extract the frame length. DCD processing has not been shown in the Scan Mode flowchart of FIG. 9, since the figure only shows the process as relevant to LMAC 120.

Thus, an exemplary method of operating the LMAC comprises the following steps. A first step of placing the LMAC in a scan mode where the cyclic-prefix length and frame length are ascertained and parameters on the quality of the base station's signal are collected and provided to the UMAC, and wherein data is not exchanged with the UMAC or the higher protocol-layer unit during the scan mode. A second step of remaining in scan mode until at least a point in time when the LMAC is receiving frame control headers at an interval equal to the ascertained frame length. A further step of placing the LMAC in a run mode (by the UMAC) when the cyclic-prefix length and the frame length are ascertained, the media-access control unit processes at least one flow of data to the UMAC and, in turn, to the network protocol-layer unit during the run mode. The first step may further comprise ascertaining an identifier of a base station provided in the received frames, obtaining an identifier of a base station to synchronize to, and checking the base-stations identifiers ascertained from the received frames against the obtained base-station identifier. The media-access control unit is not placed in run mode until the base-station identifier ascertained from the frames matches the obtained base-station identifier.

Figure 10B:
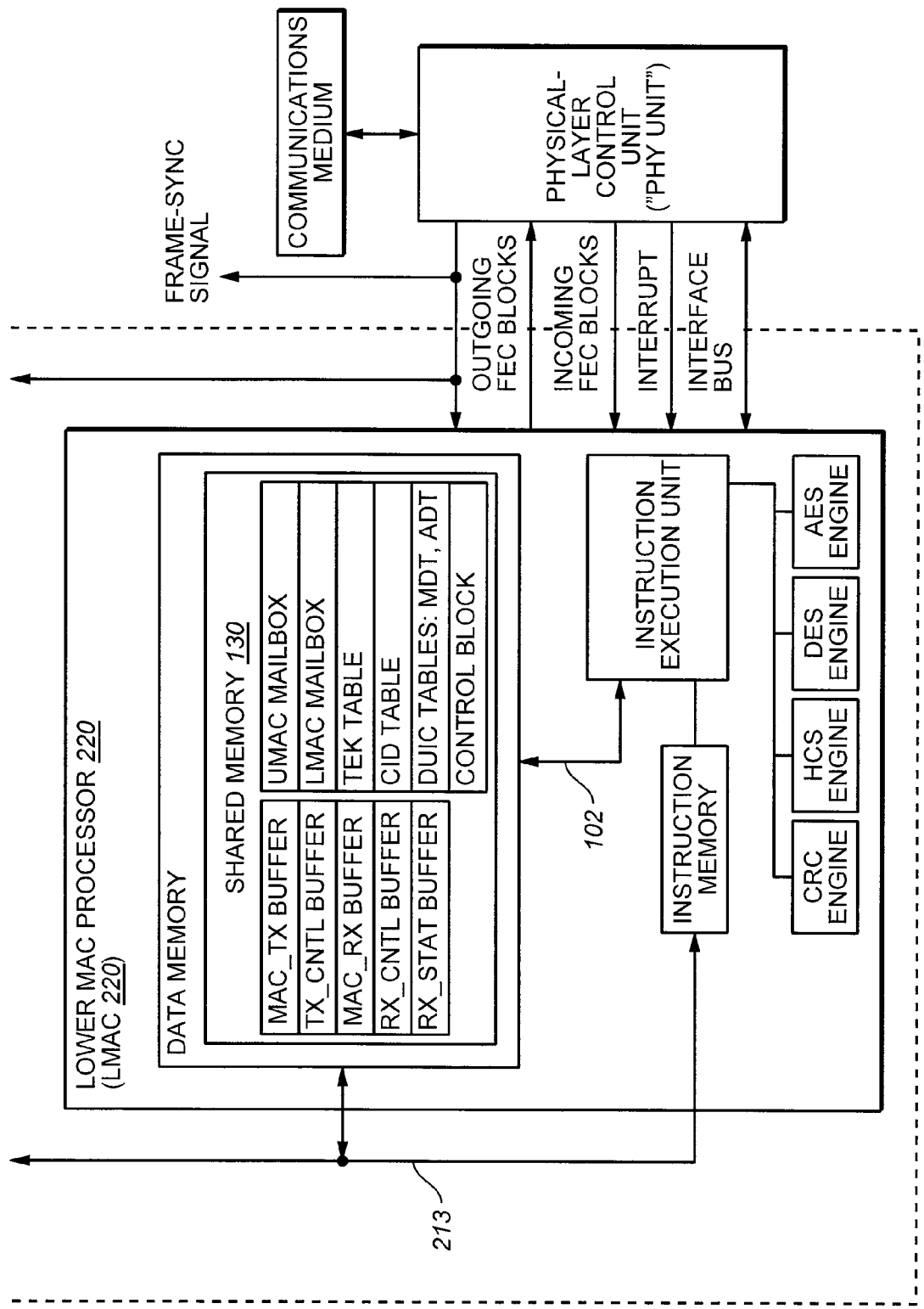
FIG. 10 shows a second exemplary embodiment of a media-access control unit according to an invention of the present application.

Connection to External UMAC. FIG. 10 shows and exemplary media-access control unit 200 which has a feature to selectively connect LMAC 120 to either UMAC 110 or an external UMAC processor, the latter of which is shown at the upper left corner of the figure. To facilitate this coupling, shared memory 130 is incorporated with the data memory of LMAC 120 as shown in the figure. This memory is a dual port memory, have a first bus access port coupled to the bus 102 that goes to the instruction execution unit of LMAC 120, and a second bus access port that is coupled to an internal bus 213, which in turn is as coupled to a bi-directionals selector 210. Depending upon the state of a selection signal CMOD, bi-directional selector 210 couples internal bus 213 to either the internal bus 101 that goes to the UMAC 110, or to an external bus port 215 that can be coupled to an external UMAC processor. Bi-directional selector 210 may be as simple as a bidirectional bus multiplexer, or may comprise a multiplexing bus bridge that provides data translation between different bus protocols. Examples of bus bridges are provided in our co-pending patent applications Ser. No. 11/313,527, entitled "BURST-CAPABLE BUS BRIDGES FOR COUPLING DEVICES TO INTERFACE BUSES" and Ser. No. 11/313,873, entitled "BURST-CAPABLE INTERFACE BUSES FOR DEVICE-TO-DEVICE COMMUNICATIONS," both filed on Dec. 20, 2005, and both of which are incorporated herein by reference. Internal bus 213 also couples to the instruction memory of LMAC 120 (which can be a dual port memory), which enables the external UMAC to download new sets of instructions to operate LMAC 110. This provides great flexibility in adapting to future changes in the IEEE Wireless Standard. Signal CMOD may be provided as an input to MAC unit 200 by way of a pin connection to the chip on which MAC unit 200 is integrated, or it may be set by LMAC 120 after LMAC 120 samples a signal on a pin connection.

If it is not important to couple internal bus 213 to the instruction memory of LMAC 120, then, referring to FIG. 5, one may simply interpose selector 210 between UMAC 110 and shared memory 130 of MAC Unit 100. In this case, shared memory 130 does not need to be part of the data memory of LMAC 120.

As integrated on an IC chip with LMAC 120, UMAC 110 is more than sufficient to handle subscriber station applications and many base-station applications. However, for large base-station applications, it may be advantageous to use an external computer to implement UMAC 120 for faster execution and data handling speeds, and to provide faster access to the network layer. The architecture of media-access control unit 200 unit enables one provide a single chip that can be used in all of these applications.

In preferred embodiments of MAC unit 200, the bus that is coupled to external bus port 215 comprises an inventive data burst based bus, and selector 210 comprises a bus bridge that translates between the data burst based bus and a conventional memory bus. The inventive bus and bus bridge are next described. In the discussion that follows, the term "burst" relates to a sequence of data transmitted over a bus, not to a transmission bursts on the communications medium that serves a network.

While the present inventions have been particularly described with respect to the illustrated embodiments, it will be appreciated that various alterations, modifications and adaptations may be made based on the present disclosure, and are intended to be within the scope of the present inventions. While the inventions have been described in connection with what are presently considered to be the most practical and preferred embodiments, it is to be understood that the present inventions are not limited to the disclosed embodiments but, on the contrary, are intended to cover various modifications and equivalent arrangements included within the scope of the appended claims.

What is claimed is:

1. A method operating a media-access control unit in communications network were a base station transmits frames of data, each frame having a frame duration and using a cyclic prefix in its frame symbols, the cyclic-prefix having a cyclic-prefix length, each frame also having a frame control header, the media-access control unit capable of processing the flow of data between a higher protocol-layer unit and a physical-layer control unit of a network communications component, the physical-layer control unit interfacing with a communications medium, the method comprising the steps:

(a) placing the media-access control unit in a scan mode where the cyclic-prefix length and frame length are ascertained and one or more parameters relating to the signal quality of the base station are collected, wherein data is not exchanged with the higher protocol-layer unit during the scan mode;

(b) remaining in scan mode until at least a point in time when the media-access control unit is receiving frame control headers at an interval equal to the ascertained frame length; and (c) thereafter placing the media-access control unit in a run mode when the cyclic-prefix length and the frame length are ascertained, the media-access control unit processing at least one flow of data to the higher protocol-layer unit during the run mode.

2. The method of claim 1 wherein step (a) further comprises ascertaining an identifier of a base station provided in the received frames.

3. The method of claim 2 further comprising a step of obtaining an identifier of a base station to synchronize to, and wherein step (a) further comprises checking the base-stations identifiers ascertained from the received frames against the obtained base-station identifier, and wherein the media-access control unit is not placed in run mode until the base-station identifier ascertained from the frames matches the obtained base-station identifier.

* * * * *